United States Patent
Ernström et al.

(10) Patent No.: US 12,500,715 B2
(45) Date of Patent: Dec. 16, 2025

(54) RESOURCE MEASUREMENT REPORTING FOR BEAM BASED POSITIONING

(71) Applicant: Telefonaktiebolaget LM Ericsson (publ), Stockholm (SE)

(72) Inventors: Per Ernström, Stockholm (SE); Gustav Lindmark, Linköping (SE); Fredrik Gunnarsson, Linköping (SE); Satyam Dwivedi, Solna (SE); Florent Munier, Västra Frölunda (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 18/275,181

(22) PCT Filed: Feb. 1, 2022

(86) PCT No.: PCT/EP2022/052336
§ 371 (c)(1),
(2) Date: Jul. 31, 2023

(87) PCT Pub. No.: WO2022/162241
PCT Pub. Date: Aug. 4, 2022

(65) Prior Publication Data
US 2024/0106594 A1    Mar. 28, 2024

Related U.S. Application Data

(60) Provisional application No. 63/144,326, filed on Feb. 1, 2021.

(51) Int. Cl.
*H04W 24/10*    (2009.01)
*H04L 5/00*    (2006.01)
*H04W 72/02*    (2009.01)

(52) U.S. Cl.
CPC .......... *H04L 5/0048* (2013.01); *H04W 24/10* (2013.01); *H04W 72/02* (2013.01)

(58) Field of Classification Search
CPC ... H04W 72/02; H04W 72/56; H04W 72/563; H04W 28/26; H04W 28/0236
(Continued)

(56) References Cited

U.S. PATENT DOCUMENTS

| | | | |
|---|---|---|---|
| 11,785,494 B2 * | 10/2023 | Hwang | H04L 1/1685 370/329 |
| 11,985,632 B2 * | 5/2024 | Xue | H04W 72/02 |
| 12,250,660 B2 * | 3/2025 | Ye | H04W 28/26 |
| 2020/0267684 A1 | 8/2020 | Huang et al. | |
| 2023/0109093 A1 * | 4/2023 | Xue | H04W 72/56 370/329 |

(Continued)

FOREIGN PATENT DOCUMENTS

WO    20200206021 A1    10/2020

OTHER PUBLICATIONS

S. Dwivedi et al., "Positioning in 5G Networks," in IEEE Communications Magazine, vol. 59, No. 11, pp. 38-44, Nov. 2021, doi: 10.1109/MCOM.011.2100091 (Year: 2021).*

(Continued)

*Primary Examiner* — William D Cumming
(74) *Attorney, Agent, or Firm* — Rothwell, Figg, Ernst & Manbeck, P.C.

(57) ABSTRACT

A communication device in a communications network receives (1710) first configuration information from a network node in the communications network. The first configuration can include an indication of a downlink, DL, positioning reference signal, PRS, resource of a plurality of DL PRS resources. The communication device can further perform (1720) at least one DL angle of departure, AOD, measurement based on the first configuration information. The communication device can further receive (1730) second configuration information from the network node. The second configuration information can include an indication (Continued)

of a subset of the plurality of DL PRS resources. The communication device can further report (1750) one or more DL AOD measurements.

20 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2023/0180186 A1* | 6/2023 | Ye | .................. | H04W 72/563 370/329 |
| 2023/0209388 A1* | 6/2023 | Hwang | ............. | H04W 28/0236 370/329 |
| 2024/0106594 A1* | 3/2024 | Ernström | ............. | H04L 5/0048 |

OTHER PUBLICATIONS

3GPP TS 36.355 V16.0.0 (Jul. 2020), 3rd Generation Partnership Project; Technical Specification Group Radio Access Network; Evolved Universal Terrestrial Radio Access (E-UTRA); LTE Positioning Protocol (LPP), (Release 16), 5G, Jul. 2020 (8 pages).
3GPP TS 38.215 V16.4.0 (Dec. 2020), 3rd Generation Partnership Project; Technical Specification Group Radio Access Network; NR; Physical layer measurements (Release 16), 5G, Dec. 2020 (25 pages).
3GPP TS 38.331 V16.3.0 (Dec. 2020), 3rd Generation Partnership Project; Technical Specification Group Radio Access Network; NR; Radio Resource Control (RRC) protocol specification (Release 16), 5G, Dec. 2020 (937 pages).
3GPP TS 38.455 V16.2.0 (Jan. 2021), 3rd Generation Partnership Project; Technical Specification Group Radio Access Network; NG-RAN; NR Positioning Protocol A (NRPPa), (Release 16), 5G, Jan. 2021 (151 pages).
International Search Report and Written Opinion dated Jun. 7, 2022 issued in International Patent Application No. PCT/EP2022/052336 (18 pages).
CATT: "Remaining issues on NR Positioning Procedures", 3GPP TSG RAN WG1 Meeting #101; R1-2003635, e-Meeting, May 25-Jun. 5, 2020 (pp. 1-5).
Moderator (Ericsson) "FL summary for AI 8.5.3 Accuracy improvements for DL-AoD positioning" 3GPP TSG-RAN WG1 Meeting #103-e, draft R1-2101920; e-Meeting, Jan. 25-Feb. 5, 2021 (44 pages).

* cited by examiner

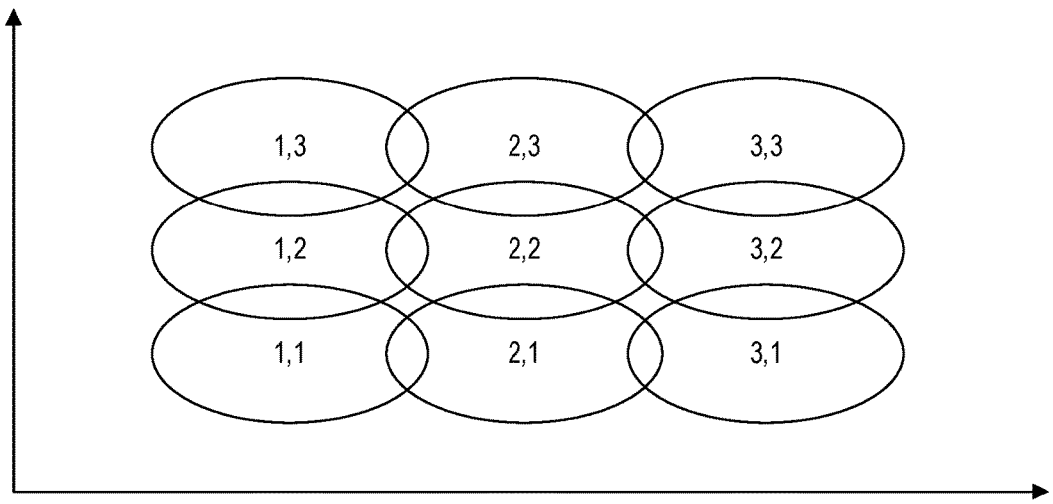

FIG. 5

```
NR-DL-PRS-Resource-r16 ::= SEQUENCE {
    nr-DL-PRS-ResourceID-r16          NR-DL-PRS-ResourceID-r16,
    dl-PRS-SequenceID-r16             INTEGER (0.. 4095),
    dl-PRS-CombSizeN-AndReOffset-r16  CHOICE {
        n2-r16                            INTEGER (0..1),
        n4-r16                            INTEGER (0..3),
        n6-r16                            INTEGER (0..5),
        n12-r16                           INTEGER (0..11),
        ...
    },
    dl-PRS-ResourceSlotOffset-r16     INTEGER (0..nrMaxResourceOffsetValue-1-r16),
    dl-PRS-ResourceSymbolOffset-r16   INTEGER (0..12),
    dl-PRS-QCL-Info-r16               DL-PRS-QCL-Info-r16              OPTIONAL,
    ...,
    [[
    nr-DL-PRS-ResourceID-ColumnIndex-r17  INTEGER (0..63)              OPTIONAL,
    nr-DL-PRS-ResourceID-RowIndex-r17     INTEGER (0..63)              OPTIONAL
    ]]
}
```

FIG. 6

```
-- ASN1START

NR-DL-AoD-RequestAssistanceData-r16 ::= SEQUENCE {
    nr-PhysCellID-r16           NR-PhysCellID-r16                       OPTIONAL,
    nr-AdType-r16               BIT STRING { dl-prs  (0),
                                             posCalc (1) } (SIZE (1..8)),
    ...,
    [[
    adjancentBeamInfoRequestList-r17    AdjacentBeamInfoRequestList-r17         OPTIONAL
    ]]
}

AdjacentBeamInfoRequestList-r17 ::=SEQUENCE SIZE(1..maxNrOfRequest)of AdjacentBeamInfoRequest-r17

// UE requests adjancent beams for below center resource

AdjacentBeamInfoRequest-r17 ::= SEQUENCE {
    dl-PRS-ID-r17               INTEGER (0..255)
    dl-PRS-ResourceSetID-r17    INTEGER (0..7)
    dl-PRS-ResourceID-r17       INTEGER (0..63)

}

-- ASN1STOP
```

FIG. 9

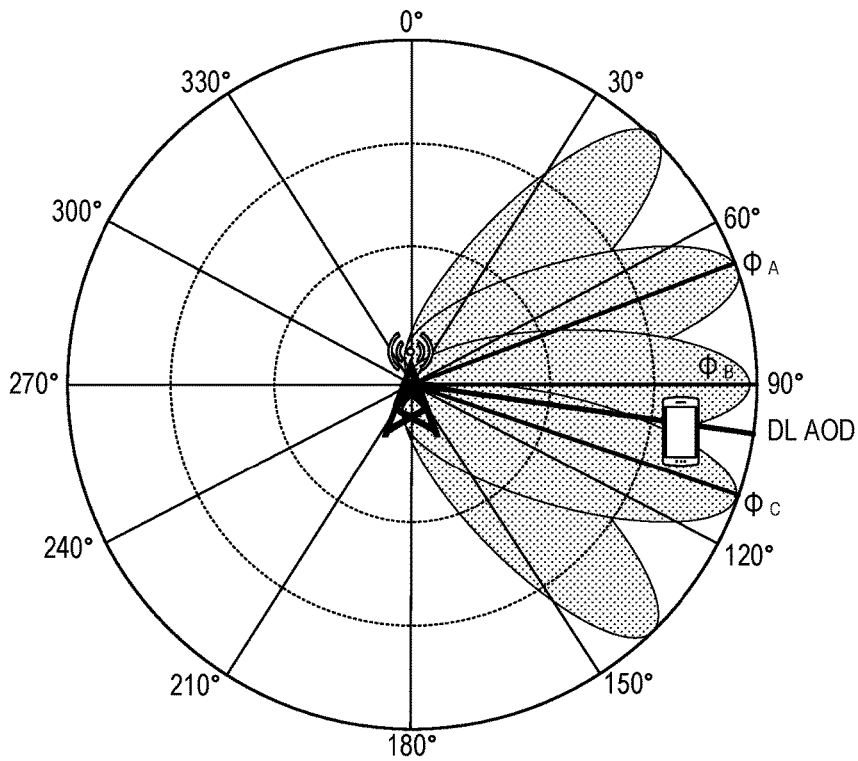

FIG. 10

RESOURCE MEASUREMENT REPORTING FOR BEAM BASED POSITIONING

CROSS REFERENCE TO RELATED APPLICATIONS

This application is a 35 U.S.C. § 371 National Stage of International Patent Application No. PCT/EP2022/052336, filed 2022 Feb. 1, which claims priority to U.S. Provisional Patent Application No. 63/144,326, filed on 2021 Feb. 1, the disclosures of which are incorporated herein in their entirety by reference.

TECHNICAL FIELD

Disclosed are embodiments relating to radio resource measurement, reporting, and positioning, and in particular, relating to neighboring resources, beams, and/or estimation of downlink ("DL") Angle of Departure ("AOD").

BACKGROUND

FIG. 1 illustrates an example of a new radio ("NR") network (e.g., a 5th Generation ("5G") network) including a 5G core ("5GC") network 130, network node 120 (e.g., 5G base station ("gNB")), multiple communication devices 110 (also referred to as user equipment ("UE")).

5G is the fifth generation of mobile communications, addressing a wide range of use cases, including enhanced mobile broadband ("eMBB"), ultra-reliable low-latency communications ("URLLC"), and massive machine type communications ("mMTC"). 5G includes the NR access stratum interface and the 5GC. The NR physical and higher layers may reuse parts of the long term evolution ("LTE") specification, with added functionality and components as needed, for instance, by new use cases.

Positioning has been a topic in LTE standardization since the 3$^{rd}$ Generation Partnership Project ("3GPP") Release 9. The primary objective was initially to fulfill regulatory requirements for emergency call positioning but other use case like positioning for industrial internet-of-things ("I-IoT") are becoming important. Positioning in NR can be supported by the architecture 200 shown in FIG. 2. The Location Management Function ("LMF") 230 is the location node in 5G/5GC/NR. There are also interactions between the location node and the gNodeB 220 via the NR Positioning Protocol A ("NRPPa"), as described in 3GPP TS 38.455 V 16.20.0. The interactions between the gNodeB and the device are supported via the Radio Resource Control ("RRC") protocol, 3GPP TS 38.331 V 16.3.0 while the location node interfaces with the UE 110 via the LTE positioning protocol ("LPP"), 3GPP TS 36.355 V 16.0.0. LPP is common to both NR and LTE. With respect to FIG. 2, the gNB and the ng-eNB may not always both be present. When both the gNB and the ng-eNB are present, the NG-C interface is typically only present for one of them.

In the legacy LTE standards, one or more of the following techniques are supported:
  Enhanced Cell Identifier ("ID")—essentially cell ID information to associate the device to the serving area of a serving cell, and then additional information to determine a finer granularity position.
  Assisted Global Navigation Satellite System ("GNSS")—GNSS information retrieved by the device, supported by assistance information provided to the device from evolved service mobile location center ("E-SMLC").
  Observed Time Difference of Arrival ("OTDOA")—the device estimates the time difference of reference signals from different base stations and sends to the E-SMLC for multi-lateration.
  Uplink TDOA ("UTDOA")—the device is requested to transmit a specific waveform that is detected by multiple location measurement units (e.g., an eNB) at known positions. These measurements are forwarded to E-SMLC for multi-lateration.

In NR Rel. 16, a number of positioning features were specified. A new downlink ("DL") reference signal, the NR DL Positioning Reference Signal ("PRS") was specified. A benefit of this signal in relation to the LTE DL PRS is the increased bandwidth, configurable from 24 to 272 resource blocks ("RBs"), which can provide an improvement in time of arrival ("TOA") accuracy. The NR DL PRS can be configured with a comb factor of 2, 4, 6, or 12. Comb-12 allows for twice as many orthogonal signals as the comb-6 LTE PRS.

In certain aspects, Rel-16 NR DL PRS is organized in a 3-level hierarchy:
  PRS resource—can be associated to a beam former for directive transmission of a DL-PRS.
  PRS resource set—corresponds to a collection of PRS resources (beams) which are all originating from the same Transmission and Reception Point ("TRP"). All resource in the same set have the same comb factor.
  PRS frequency layer—gathers PRS resource sets from (potentially) multiple base station, having common parameters in common. If two resource sets are in the same frequency layer, they may: operate in the same band with the same subcarrier spacing; have the same comb factor; have the same starting PRB and bandwidth.

In NR Rel. 16, the NR uplink ("UL") sounding reference signal ("SRS") for positioning was introduced. Compared to the existing SRS in release 15, the Rel. 16 NR SRS for positioning allows for a longer signal, up to 12 symbols (compared to 4 symbols in Rel. 15), and a flexible position in the slot (only last six symbols of the slot can be used in Rel. 15). It also allows for a staggered comb resource element ("RE") pattern for improved TOA measurement range and for more orthogonal signals based on comb offsets (comb 2, 4 and 8) and cyclic shifts. The use of cyclic shifts longer than the orthogonal frequency division multiplexing ("OFDM") symbol divided by the comb factor is, however, not currently supported by Rel. 16, notwithstanding that this is an advantage of comb-staggering (e.g., in indoor scenarios). Power control based on neighbor cell synchronization signal block ("SSB")/DL PRS is supported as well as spatial quasi-colocation ("QCL") relations towards a channel state information reference signal ("CSI-RS"), an SSB, a DL PRS or another SRS.

In NR Rel. 16, at least the following UE measurements are specified:
  DL Reference Signal Time Difference ("RSTD"), allowing, for instance, for DL Time Difference of Arrival ("TDOA") positioning;
  Multi-cell UE receive ("Rx")-transmit ("Tx") Time Difference measurement, allowing for multi-cell round trip time ("RTT") measurements; and
  DL PRS Reference Signal Receive Power ("RSRP").

In NR Rel. 16, at least the following gNB measurements are specified and supported: UL-RTOA (relative time of arrival), useful for UL TDOA positioning; gNB Rx-Tx time difference, useful for multi-cell RTT measurements; UL SRS-RSRP; and azimuth of arrival and zenith of arrival.

There remains a need for procedures, measurements, reporting, and/or signaling for improved accuracy, including for DL-AOD for UE-based and network-based (including UE-assisted) positioning applications.

SUMMARY

According to some embodiments, a method performed by a communication device in a communications network is provided. The method includes receiving first configuration information from a network node in the communications network. The first configuration includes an indication of a downlink, DL, positioning reference signal, PRS, resource of a plurality of DL PRS resources. The method further includes performing at least one DL angle of departure, AOD, measurement based on the first configuration information. The method further includes receiving second configuration information from the network node. The second configuration information includes an indication of a subset of the plurality of DL PRS resources. The method further includes reporting one or more DL AOD measurements.

According to other embodiments, a method performed by a network node in a communications network is provided. The method includes transmitting first configuration information to a communication device in the communications network. The first configuration information includes an indication of a downlink, DL, positioning reference signal, PRS, resource of a plurality of DL PRS resources. The method further includes transmitting second configuration information to the communication device. The second configuration information includes an indication of a subset of the plurality of DL PRS resources to be associated with the DL PRS resource. The method further includes receiving location information comprising a measurement report from the communication device.

According to other embodiments, a communication device in a communications network is provided. The communication device includes processing circuitry and memory coupled to the processing circuitry. The memory has instructions stored therein that are executable by the processing circuitry to cause the communication device to perform operations. The operations include receiving first configuration information from a network node in the communications network. The first configuration includes an indication of a downlink, DL, positioning reference signal, PRS, resource of a plurality of DL PRS resources. The operations further include performing at least one DL angle of departure, AOD, measurement based on the first configuration information. The operations further include receiving second configuration information from the network node. The second configuration information includes an indication of a subset of the plurality of DL PRS resources. The operations further include reporting one or more measurements.

According to other embodiments, a network node in a communications network is provided. The network node includes processing circuitry and memory coupled to the processing circuitry. The memory has instructions stored therein that are executable by the processing circuitry to cause the network node to perform operations. The operations include transmitting first configuration information to a communication device in the communications network. The first configuration information includes an indication of a downlink, DL, positioning reference signal, PRS, resource of a plurality of DL PRS resources. The operations further include transmitting second configuration information to the communication device. The second configuration information includes an indication of a subset of the plurality of DL PRS resources to be associated with the DL PRS resource. The operations further include receiving location information including a measurement report from the communication device.

According to other embodiments, a computer program, computer program product, or non-transitory computer readable medium is provided to perform one of the methods above.

Various embodiments herein can improve the accuracy of DL angle of departure ("AOD") measurements, which can allow a network to more accurately determine a position of a communication device (sometimes referred to as a user equipment ("UE")). More accurately determining a position of a communication device can improve network resource allocation, signal strength, and user experience.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 5 is a diagram illustrating an example of DL PRS resource (e.g., beam) numbering in two dimensions in accordance with some embodiments;

FIG. 6 is a diagram illustrating an example of ASN.1 in accordance with some embodiments;

FIG. 9 is a diagram illustrating an example of an ASN.1 where the UE makes such a request in accordance with some embodiments;

FIGS. 10-11 are schematic diagrams illustrating an example of an interpolation processes in accordance with some embodiments;

DETAILED DESCRIPTION

Some of the embodiments contemplated herein will now be described more fully with reference to the accompanying drawings. Embodiments are provided by way of example to convey the scope of the subject matter to those skilled in the art. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

According to embodiments, the selection of resources for resource radio condition measurements influence the estimation accuracy that can be achieved, for instance, for the downlink ("DL") angle of departure ("AOD"). In certain aspects, improved DL AOD accuracy can result in better positioning performance. In some embodiments, a communication device (also referred to herein as a user equipment ("UE")) may make determinations regarding what resources are selected and measured, and in some cases, what measurements are performed. In certain aspects, a DL positioning reference signal ("PRS") reference signal receive power ("RSRP") measurement may be included for one to eight additional measurements in the DL-AOD location information, and according to embodiments, a determination is made regarding what DL PRS resources should be reported as additional measurements. This can enable their full use for DL-AOD accuracy improvements A first example ("Example 1") is described below.

In Example 1, a UE-focused approach is described, in which the UE can make selections regarding resource measurements, including in some embodiments, providing to and requesting information from a network node.

Figure 1:
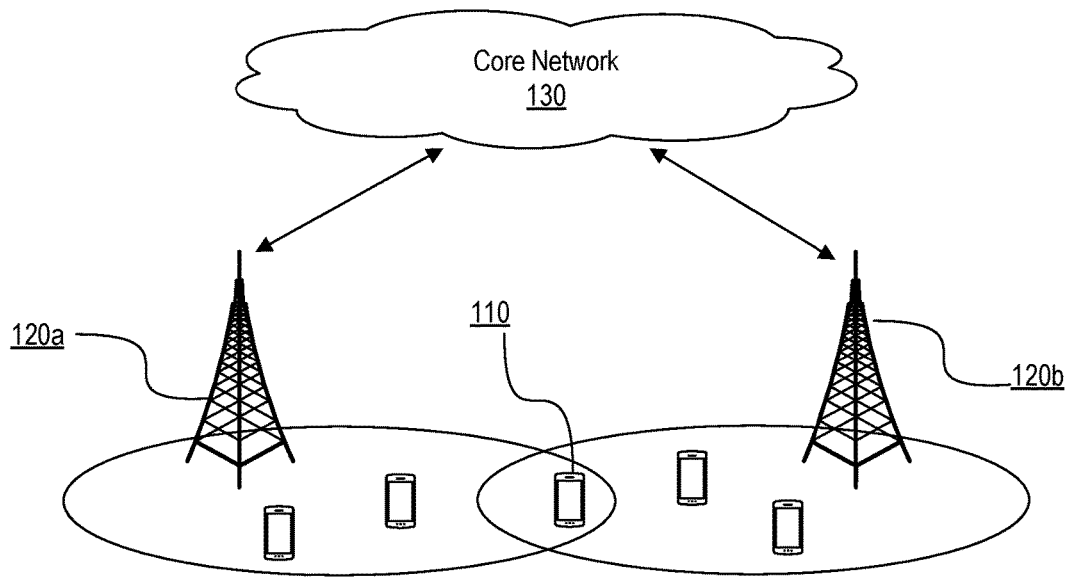
FIG. 1 is a schematic diagram illustrating an example of a wireless communications network.
Figure 2:
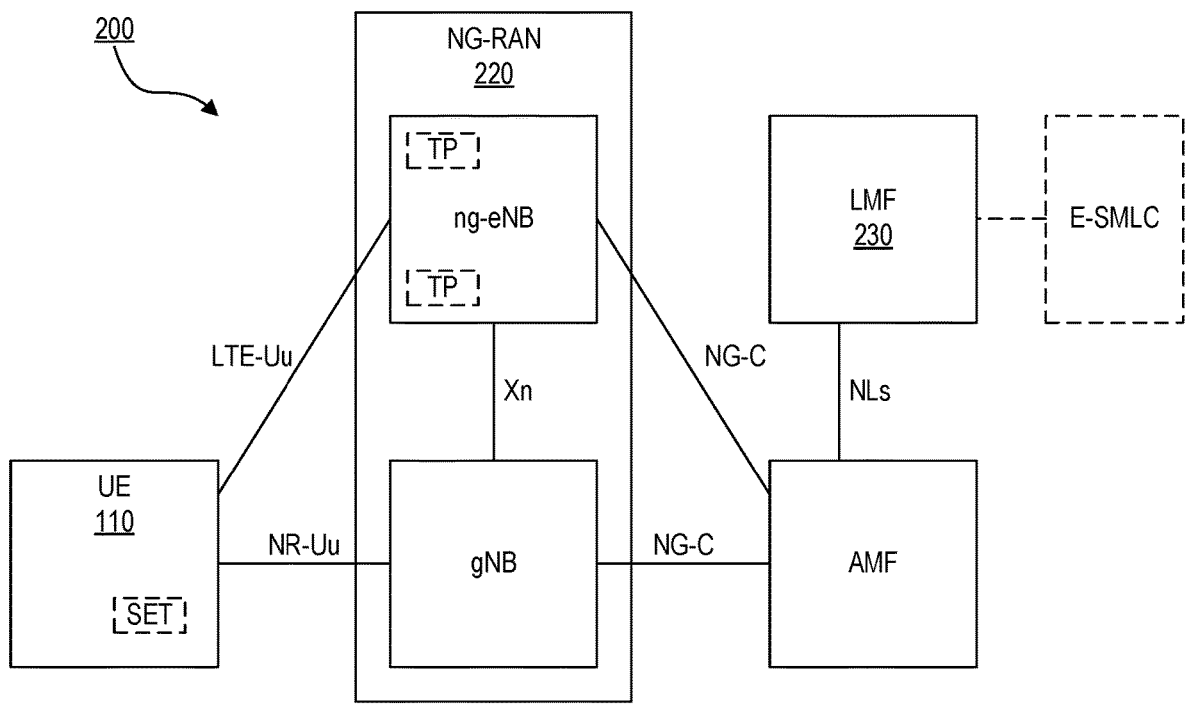
FIG. 2 is a block diagram illustrating an example of a 5$^{th}$ generation ("5G") architecture (e.g., using next generation-radio access network ("NG-RAN") Rai-15 protocols)
Figure 3:
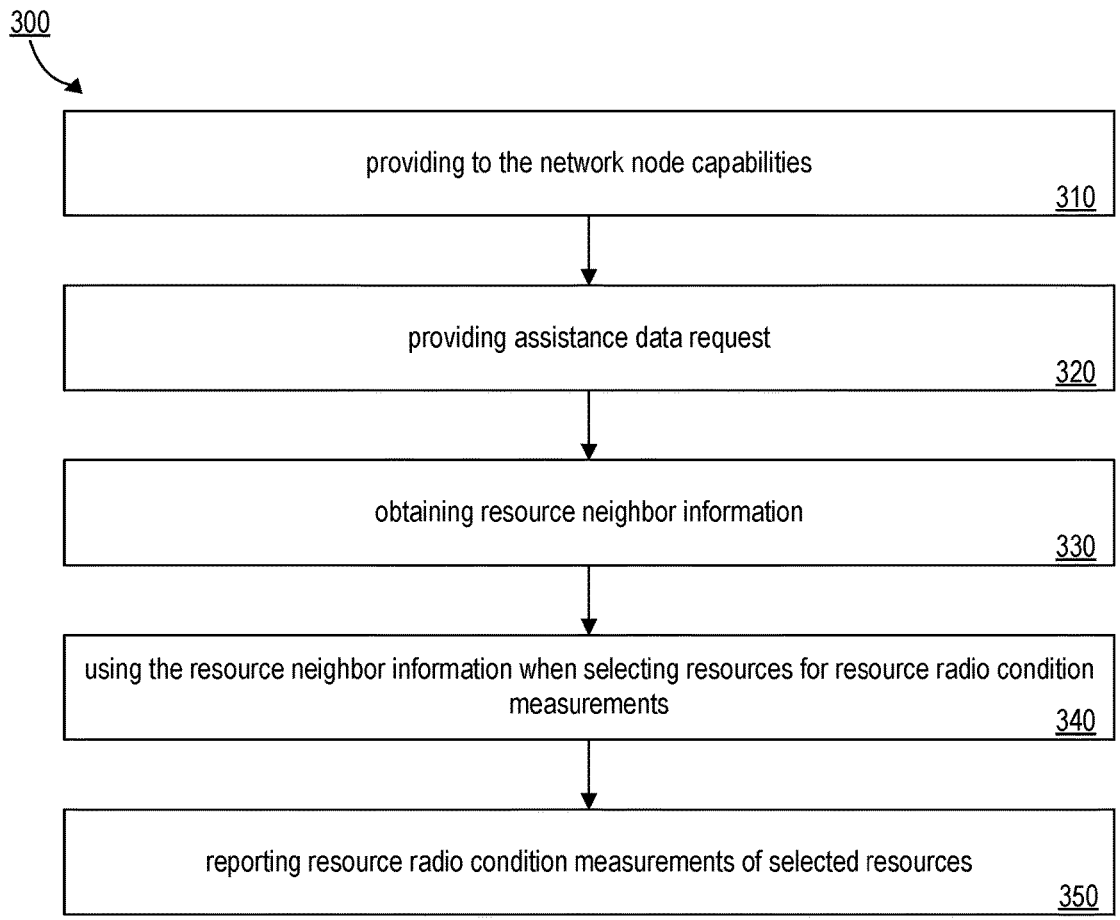
FIG. 3 is a flow chart illustrating an example of a process in accordance with some embodiments.

Referring now to FIG. 3, a process 300 is provided according to embodiments. The process 300 may be performed, for instance, by a UE. At block 310, which may be optional in some embodiments, a device (e.g., a UE) provides its capabilities. This may be, for example, its capabilities with respect to supporting resource neighbor information for resource radio condition measurements. The providing may be, in embodiments, in response to a request from a network node. At block 320, which may be optional in some embodiments, the device provides a request to a network node for assistance data. This may be, for instance, also in response to a request from the network node. At block 330, the device obtains, from the network node, resource neighbor information. The information may be provided from the network node in response to the request (block 320). The device may then use (e.g., in block 340) the obtained resource neighbor information when performing a selection/determination. This could include one or more of selecting resources for resource radio condition measurements, and/or selecting which resource radio condition measurements to use. At block 350, the device reports resource radio condition measurements of selected resources, and/or utilizes selected measurements for UE-based positioning. In certain aspects, the operations in block 350 occurs after the UE performs measurements (e.g., the selected measurements) of the selected resources.

Aspects of the disclosure are related to the notion of DL PRS resource neighbors. First and second DL-PRS resources may be neighbors, for instance, if the first transmission beam associated to the first DL-PRS resource is adjacent to the second transmission beam associated to the second DL-PRS resource. The transmission beams of an antenna panel/system/branch can be arranged in different ways, and transmission beams can be adjacent in different dimensions or directions. For example, transmission beams can be adjacent in a horizontal direction, vertical direction, or in some other direction. Details of different embodiments related to resource neighbors are described herein.

The signal receive power corresponding to a specific path could be separated from the rest of the signal receive power in the time and/or spatial domain. Separation in spatial and time domain can be achieved, for example, by estimating the CIR for each (real or virtual) antenna element, and then transforming the spatial dimensions into beamspace (e.g. with a Discrete Fourier Transform ("DFT")). This gives the CIR in time-beam-space (3D-CIR for a 2D antenna array). Different paths can then be identified as peaks in this 3D-space, and the power of each identified path can be estimated separately.

Aspects of the disclosure are also related to a DL-PRS resource radio condition, which can be a measured radio condition of a received DL-PRS signal configured with a DL-PRS resource in embodiments. Examples of a measured radio condition of a DL-PRS resource may comprise one or more of:

A DL-PRS RSRP measurement, for instance, aggregating all received power contributions associated to a DL-PRS resource. In some examples, provided in 3GPP TS 38.215 V 16.1.0, "DL PRS reference signal received power (DL PRS-RSRP), is defined as the linear average over the power contributions of the resource elements that carry DL PRS reference signals configured for RSRP measurements within the considered measurement frequency bandwidth."

A measurement (for example, a PRS RSRP) of the first detected path of a received DL-PRS signal.

A measurement (for example, a PRS RSRP) of a specific detected path of a received DL-PRS signal.

A measurement (for example, a PRS RSRP) of the strongest detected path of a received DL-PRS signal.

A PRS signal quality measurement, for instance, aggregating all power contributions associated to a resource, or of the first detected path of a received DL-PRS signal, or of a specific detected path of a received DL-PRS signal or of the strongest detected path of a received DL-PRS signal.

A cross-correlation metric, where the received DL PRS signal is cross-correlated with a DL-PRS signal replica and a cross-correlation metric is determined.

In NR Rel. 16, a UE can report one main measurement and up to seven additional measurements (including DL-PRS RSRP) within the NR-DL-AOD location information report; however, it is not specified for what DL PRS resources the measurements should be performed and reported. Similarly, while the UE can report one main measurement and up to three additional measurements (including DL-PRS RSRP) within the NR-DL-TDOA location information report (as well as within the NR-Multi-RTT location information report), it is not specified for which DL PRS resources the measurements should be performed and reported.

Embodiments include methods for how a UE should select DL PRS resources to measure and report, and methods for how the network can control the UE behavior in this respect, and thus, allow for accurate interpolation. Aspects of the disclosure are applicable to, but not limited to, NR-DL-AOD, the NR-DL-TDOA, and the NR-Multi-RTT.

According to embodiments, the content of the obtained neighbor resource information, for instance as illustrated in block 330, may include one or more of the following.

The neighbor information can be intended to allow the UE to deduce what DL PRS resources are neighbors to a given DL PRS resource. In some embodiments the neighbor information is given in a direct way, such as through an adjacency matrix. In other embodiments, the information is provided indirectly. For instance, the information may be provided through the numbering of the DL PRS resources in one or two dimensions.

In some DL PRS resource selection schemes (e.g., in association with block 340 of FIG. 3) the concept of "general neighbors" can be applied. This may not distinguish between neighbors in different dimensions. As an example, and as illustrated in FIG. 5, DL PRS resources (1,1), (1,2), (1,3), (2,1), (2,3), (3,1), (3,2), and (3,3) are all general neighbors to DL PRS resource (2,2). The term "general neighbor" is used instead of simply using the term "neighbor" to distinguish it from "neighbors in dimension 1" and "neighbors in dimension 2" described below.

In some DL PRS resource selection schemes (e.g., in connection with block 340 of FIG. 3) the concept of neighbors in each of the two dimensions is used. As an example, in FIG. 5, DL PRS resources (1,2) and (3,2) could be considered neighbors to DL PRS resource (2,2) in dimension 1 while (2,1) and (2,3) are neighbors to DL PRS resource (2,2) in dimension 2. As another example, in FIG. 5, DL PRS resources (1,1), (1,2), (1,3) and (3,1), (3,2), (3,3) could be considered neighbors to DL PRS resource (2,2) in dimension 1 while (1,1), (2,1) (3,1) and (1,3), (2,3), (3,3) are neighbors to DL PRS resource (2,2) in dimension 2.

Figure 4:
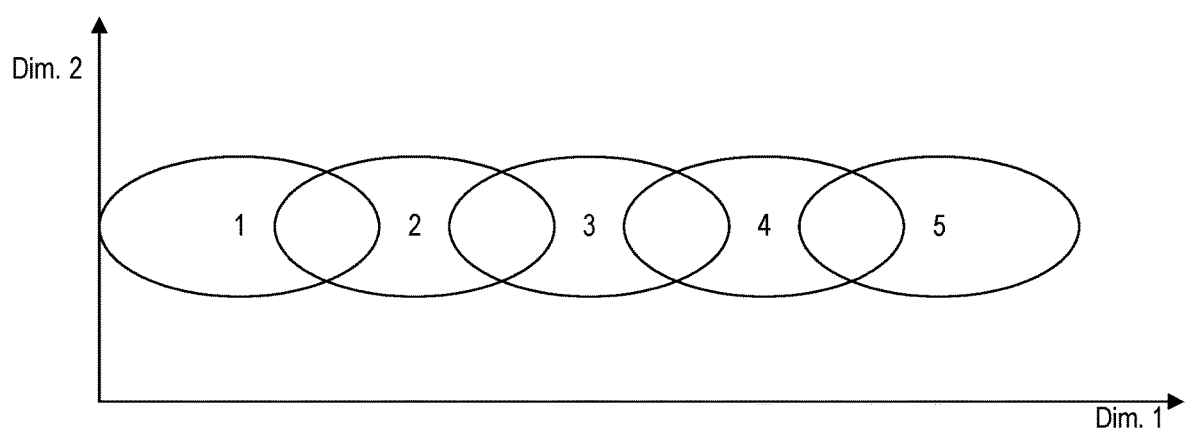
FIG. 4 is a diagram illustrating an example of associated beam directions of DL PRS resources varying in one dimension in accordance with some embodiments.

In certain aspects, the beam directions associated to DL PRS resources vary in only one dimension. This is illustrated, for instance, in FIG. 4. In this example, each DL PRS resources is attributed to an order number based on the associated beam direction, where the order of numbers is in increasing or decreasing beam directions. Two DL PRS resources may be general neighbors if the attributed order numbers differ by 1.

In some embodiments, 1D beam numbering may be implicit. For instance, the DL-PRS resources can be associated with a DL PRS resource ID as part of the assistance data. In certain aspects, the DL-PRS resources IDs are associated to the DL PRS resources in a way that makes it possible for the UE to know what DL PRS resources are neighbors. In one embodiment, the DL PRS resource IDs increase by one for each beam along the one spatial dimension, and the UE can identify neighbors as DL PRS resources with DL PRS resource ID differing by 1. In another embodiment, the DL PRS resource ID is monotonically increasing along the one spatial dimension, and the UE can identify neighbors as two DL PRS resources that have DL PRS resource IDs such that no other DL PRS resource has a DL PRS resource ID which lies between the DL PRS resource IDs of the two DL PRSs. In another embodiment, an indication informs the UE that the DL-PRS resource IDs are associated to DL PRS Resources in a way that that makes it possible for the UE to know what DL PRS resources are neighbors. In one embodiment, the UE knows through pre-configuration that the DL the DL-PRS resource IDs are associated to DL PRS resources in a way that that makes it possible for the UE to know what DL PRS resources are neighbors.

Two dimensional ("2D") beam number may be used according to embodiments. This may be, for example, where each DL PRS resource is associated to two order numbers, one for each of the two dimensions and signaled to the UE. In one embodiment, two DL PRS resources are neighbors in dimension 1 if the order numbers in dimension 1 differ by 1 and the order numbers in dimension 2 are the same. Two DL PRS resources are neighbors in dimension 2 if the order numbers in dimension 2 differ by 1 and the order numbers in dimension 1 are the same. In another embodiment, two DL PRS resources are general neighbors if order numbers in one dimensions differ by a maximum of one. In another embodiment, two DL PRS resources are general neighbors if order numbers in both dimensions differ one and the order numbers in the other dimension are the same. In another embodiment, two DL PRS resources are neighbors in dimension 1 if the order numbers in dimension 1 differ by 1 and the order numbers in dimension 2 differ by 1 or less. Two DL PRS resources are neighbors in dimension 2 if the order numbers in dimension 2 differ by 1 and the order numbers in dimension 1 differ by 1 or less. In some embodiments, the resources are numbered based upon a (column, row) matrix. For example, the resources in one column may have the same column number and the resources in a row may have the same row number.

FIG. 6 illustrates an example of ASN.1.

In some embodiments, 2D beam numbering can be implicit. For example, the DL-PRS resources can be associated with a DL PRS resource ID and the number N of resources in dimension 1, which is signaled to the UE. In embodiments, the resource indices in dimension 1 and 2 are determined from the provided information according to:

$$n_1(ID) = ID \bmod N, \text{ and}$$

$$n_2(ID) = ID \operatorname{div} N,$$

where two DL PRSs with $ID_1$ and $ID_2$ are general neighbors if $|n_1(ID_1) - n_1(ID_2)| \leq 1$ and $|n_2(ID_1) - n_2(ID_2)| \leq 1$. In one embodiment, two DL PRSs with $ID_1$ and $ID_2$ are neighbors in dimension 1 if $|n_1(ID_1) - (ID_2)| = 1$ and $n_2(ID_1) = n_2(ID_2)$, and neighbors in dimension 2 if $|n_2(ID_1) - n_2(ID_2)| = 1$ and $n_1(ID_1) = n_1(ID_2)$. In a second embodiment, two DL PRS with $ID_1$ and $ID_2$ are neighbors in dimension 1 if $|n_1(ID_1) - (ID_2)| = 1 |n_2(ID_1) - n_2(ID_2)| \leq 1$, and neighbors in dimension 2 if $|n_2(ID_1) - n_2(ID_2)| = 1$ and $|n_1(ID_1) - (ID_2)| \leq 1$.

In some embodiments, for each DL PRS resource, a list of DL PRS resources that are general neighbors to the DL PRS resource is given. In one embodiment the DL PRS resource IDs are used to identify the neighbor resources, i.e. the list consists of the DL PRS resource IDs of the DL PRS resource neighbors. In one embodiment the list is of fixed length (e.g. 8 to allow for 8 general neighbor resources). In another embodiment, the list has a variable length up to a maximum (e.g. up to 8 to allow for a maximum of 8 general neighbor resources).

In this and other examples, the list (or an adjacency matrix) may be provided by the network.

In some embodiments, there is a list of neighbors in dimension 1 and dimension 2 for each DL PRS resource. For instance, for each DL PRS resource, a list of DL PRS resources that are neighbors to the DL PRS resource in dimension 1 and a list of DL PRS resources that are neighbors to the DL PRS resource in dimension 2 is given. In one embodiment the DL PRS resource IDs are used to identify the neighbor resources, i.e. the lists consist of the DL PRS resource IDs of the DL PRS resource neighbors. In one embodiment the lists are of fixed length (e.g. 2 to allow for 2 neighbor resources in each dimension). In another embodiment, the list is of variable length up to a maximum (e.g. up to 3 to allow for a maximum of 3 neighbor resources in each dimension). In another embodiment, lists of neighbors in dimension 1 and dimension 2 as described here are combined with a list of general neighbors for each DL PRS resource as described with above.

In some embodiments, the resource neighbor information is an adjacency matrix for all DL PRS resources. As an example, with $\mathcal{B} = \{b_1, b_2, \ldots, b_n\}$ as the set of all DL PRS resources, the adjacency matrix $\mathcal{A}$ is such that the matrix element (on row i and column j) $\mathcal{A}(i,j)=1$ if $b_i$ and $b_j$ are general neighbors. In certain aspects, the adjacency matrix can be efficiently encoded since it is sparse and binary. In embodiments it holds that it is square, symmetric, and that the diagonal is identically zero. Consequently, it can be encoded with $$\frac{n(n-1)}{2}$$

bits.

In some embodiments, the resource neighbor information is two adjacency matrices for all DL PRS resources. An example can use $\mathcal{B} = \{b_1, b_2, \ldots, b_n\}$ as the set of all DL PRS resources. The first adjacency matrix, $\mathcal{A}_1$, is such that $\mathcal{A}_1(i,j)=1$ if $b_i$ and $b_j$ are neighbors in dimension 1 and 0 otherwise. The second adjacency matrix, $\mathcal{A}_2$, is such that $\mathcal{A}_2(i,j)=1$ if $b_i$ and $b_j$ are neighbors in dimension 2 and 0 otherwise. Since both $\mathcal{A}_1$ and $\mathcal{A}_2$ are square and symmetric, a combined matrix $\mathcal{A}$ can be constructed from the lower triangle of $\mathcal{A}_1$ and the upper triangle of $\mathcal{A}_2$ without losing any information. According to embodiments, he matrix $\mathcal{A}$ can be encoded with $n(n-1)$ bits, where n is the total number of DL PRS resources.

In some embodiments, additional resource selection control information is provided. For example, the resource neighbor information can contain resource selection control information in addition to the resource neighbor information described in the previous subsections, controlling some aspects of the UE resource selection. In another embodiment, the additional resource selection control information contains a parameter (e.g. a flag a bit or an information element with two values) controlling whether the UE should select DL PRS resources based on "general neighbor" as described above or based on 'neighbors in 2D' as described above. In some embodiments such information could be implicitly signaled based on the form of the resource neighbor information. In one such embodiment the UE selects DL PRS resources based on "general neighbor" as described above if the resource neighbor information only gives the UE information about "general neighbors," while the UE selects DL PRS resources based on "neighbors in 2D" as described above if the resource neighbor information gives the UE information about neighbors in 2D. In another embodiment, the additional resource selection control information contains a parameter controlling whether the resource selection described above should be used. In some embodiments the resource selection control information comprise a resource priority value. The value can be provided per resource, or only for a subset of the resources. The other resources can have a pre-configured priority value such as highest priority or lowest priority.

In some embodiments, a device (e.g., the UE) can select DL PRS resources. This may apply, for instance, to operations at block 340 described in connection with FIG. 3. A selection procedure (e.g., block 340) of resources to measure, report, and/or otherwise use may comprise:

determining the resource corresponding to the strongest measured resource radio condition (e.g., the strongest resource);

selecting a neighbor resource among the neighbor resources to the strongest resource, wherein the selected neighbor resource corresponds to the strongest measured resource radio condition among the neighbor resource to the strongest resource.

In some embodiments, resource selection is based on neighbors in 2D. For instance, at block 330, the network can signal PRS resource neighbor information to the UE, giving the UE knowledge of what DL PRS resources are neighbors in each of two dimensions. Then, at block 340, the UE can utilize the resource neighbor information for one or more of:

selecting the DL PRS resource with strongest radio condition measurement, here referred to as the strongest resource;

selecting the DL PRS resource with strongest radio condition measurements among the DL PRS resources which are neighbors to the strongest resource in dimension 1–strongest dim 1 resource neighbor; and selecting the DL PRS resource with strongest radio condition measurement among the DL PRS resources which are neighbors to the strongest resource in dimension 2–strongest dim 2 resource neighbor, and wasn't selected in step 2.

In some embodiments, resource selection is based on general neighbors.

At block 330, the NW signals DL PRS resource neighbor information to the UE, giving the UE knowledge of what DL PRS resource are general neighbors independently of the two dimensions. At block 340, the UE utilize the resource neighbor information for:

selecting the DL PRS resource with strongest radio condition measurement (e.g., "the strongest resource"); and selecting the N DL PRS resources with strongest radio condition measurements among the DL PRS resources which are general neighbors to the strongest resource, N is a positive integer.

For N=2, the three selected resources may lie on the same line in beamspace, and in such cases only allow for interpolation in one dimension. If N>=3 this cannot happen, and thus, interpolation in 2 dimensions is always possible.

In some embodiments, resource selection is based on general neighbors ensuring a 2D-span. If the associated beam-directions or resources are ordered as in FIG. 7 or some irregular pattern and not a rectangular grid, then the embodiments based on neighbors in dimension 1 and neighbors in dimension 2 may not work. The embodiment described here does, however, work also for irregular patterns and still allows for 2D interpolation based on three selected resources. At block 330, the NW signals DL PRS resource neighbor information to the UE, giving the UE knowledge of what DL PRS resource are general neighbors independently of the two dimensions. At block 340, the UE utilize the resource neighbor information for:

selecting the DL PRS resource with strongest radio condition measurement (e.g., "the strongest resource");

selecting the DL PRS resource with strongest radio condition measurement among the general neighbors of the strongest resource, which can be referred to as "the first neighbor resource;" and selecting the DL PRS resource with strongest radio condition measurement among the DL PRS resources which are general neighbors of both the strongest resource and the first neighbor resource, which can be referred to as "the second neighbor resource."

Figure 7:
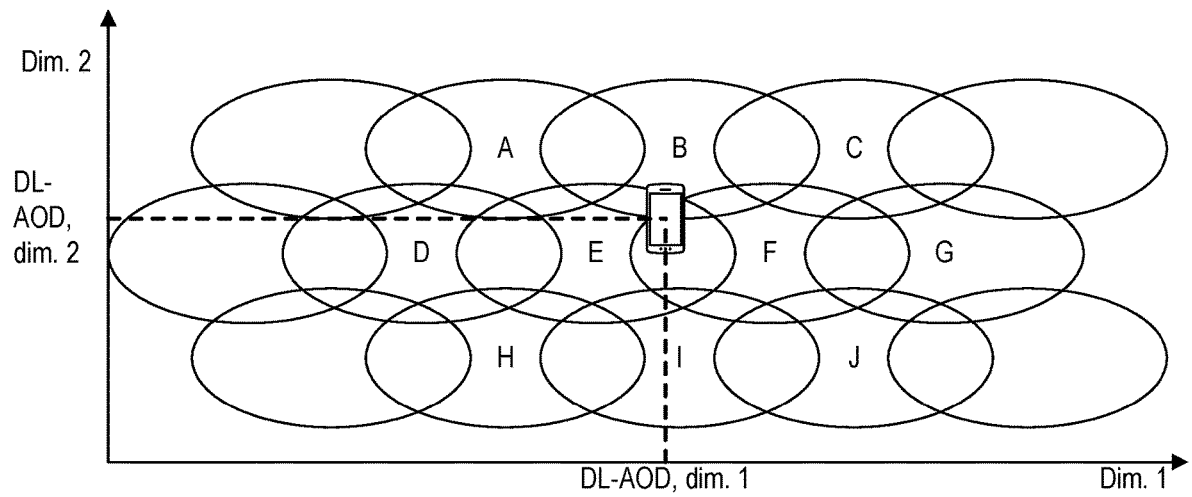
FIG. 7 is a diagram illustrating an example of beam directions associated to resources that are not ordered in a rectangular grid in accordance with some embodiments.

In FIG. 7, the beam-directions associated to resources are not ordered in a rectangular grid. Applied to the example in FIG. 7 the above procedure gives the following result:

DL PRS resource E is the strongest resource.

The neighbor resources of E is given by the set {A, B, D, F, H, I}. Among those, F is measured with highest radio condition and becomes the first neighbor.

The neighbor resources of both E and F is given by the set {A, B, D, F, H, I}∩{B, C, E, G, I, J}={B, I}. Among those, B is measured with highest radio condition and becomes the second neighbor.

By construction, the direction coordinates of the strongest resource and the first and second neighbor resources cannot lie on a line in the 2D direction space, hence they can be used for interpolation in both dimensions.

In some embodiments, resource selection is based on additional selection control information. For instance, the resource neighbor information may contain additional resource selection control information, controlling what resource selection scheme should be used, as described above. In another embodiment, the additional resource selection control information contains a parameter (e.g. a flag a bit or an information element with two values) controlling whether the UE should select DL PRS resources based on a "general neighbor" as described above, or based on "neighbors in 2D" as described above. In some embodiments, such information could be implicitly signaled based on the form of the resource neighbor information. In one such embodiment, the UE selects DL PRS resources based on "general neighbor" as described above if the resource neighbor information only gives the UE information about "general neighbors" while the UE selects DL PRS resources based on "neighbors in 2D" as described above if the resource neighbor information gives the UE information about neighbors in 2D. In another embodiment the additional resource selection control information contains a parameter controlling whether the resource selection described above should be used.

In some embodiments, the device is provided with a resource priority value. In one mode of the embodiment, the priority is used together with neighbor information, where a first selection is based on priority and a second selection for prioritized resources is based on resource neighbor information. In one mode of the embodiment, the priority is used together with neighbor information, where a first selection is based on resource neighbor information and a second selection for neighbor resources is based on priority.

In some embodiments, resource selection extends beyond three resources. That is, the device (e.g., UE) may measure and report more than three DL PRS resources. The UE may then go on to select additional neighbor resources to the strongest resource, for example, selecting in turn the strongest of the remaining neighbor resources. In another embodiment, the UE selects the fourth resource as the strongest resource which has not yet been selected and for which all neighbors are weaker (e.g., a local peak resource). After that, the UE selects neighbors to the fourth resource.

A second example ("Example 2") is described below.

In Example 2, the network (e.g., one or more network nodes) can configure the UE, and utilize reported measurements for estimating DL AOD (e.g., based on interpolation), and in certain aspects, use the estimated DL AOD to estimate UE position. In some embodiments, a two step approach can be used. In certain aspects, the two-step approach is an alternative to the approach described above and with respect to FIG. 4 and Example 1, where the UE in one step (without any need for intermediate signaling) identifies and measures the strongest resource (beam), and then, measures neighbor resources (beams) based on resource neighbor information sent to the UE in an earlier step.

In some embodiments:
1. the UE reports the strongest resource/beam to the network;
2. the network configures the UE to measure on a number of neighboring resources/beams of the strongest beam, and in some embodiments, also configures the UE to measure and report the strongest beam again;
3. the UE measures and reports the neighboring beams to the network, and in some embodiments also measures and reports the strongest beam again;
4. the network utilizes the reported measurements to estimate a value (e.g., DL AOD) based on interpolation; and
5. the network utilizes the DL AOD estimates to estimate the UE position.

The configuration and reporting of the strongest resource additional times (e.g., twice) may be needed since the measurement may change in the time between step 1 and step 3, and also because in some embodiments, step 1 and step 3 are performed based on different reference signals.

In some embodiments, the UE measures and reports all neighboring beams to the network in step 3. In another embodiment the UE measures and reports a subset of the neighboring beams to the network in step 3, where the subset is defined, for example, by one of the of the following criteria:

(a) the N strongest neighbors, where N is preconfigured or configured by the network; or
(b) the strongest neighbor in each of two groups of neighbors, where the groups are configured by the network and may correspond to neighbors in two dimensions.

In some embodiments, both step 1 and step 2 are performed based on the same DL PRS resource set (e.g., as described with respect to 2.1.0). In another embodiment, step 1 is based on CSI-RS or SSB, while the second step is based on DL PRS with QCL-D relation with the CSI-RS or SSB (e.g., as described with respect to 2.2.0).

In some embodiments, the two step approach is used where DL-PRS is used for both steps:
1. the network (e.g., the LMF) configures the UE with DL PRSs and to perform DL-AOD measurements;
2. the UE performs the DL-AOD measurement (e.g., measurements of RSRP) and measures and reports the strongest DL PRS resource for each TRP;
3. the network configures the UE to perform DL-AOD measurements with a restriction to measure on a subset of the DL PRS resources (e.g., a list of DL PRS resources that are neighbors to the DL PRS resource);
4. the UE measures and reports configured DL PRS resources;
5. the network utilizes the reported measurements to estimate DL AOD based on interpolation between the beam directions of the reported DL PRS resources; and
6. the network utilizes the DL AOD estimates to estimate the UE's position.

In some embodiments, the two step approach is used based on CSI-RS or SSB based detection of the strongest beam. As part of Rel-16, a network may configure QCL-D (Quasi colocation) relations. This can include configuring of the similarity of propagation or channel properties between the positioning reference signals and one or more Radio Resource Measurement signals/channels characterizing RRM beams. The UE is expected to provide enhanced cell ID (ECID) reports, which contain CSI-RS or SSB beams RSRP and RSRQ results. In some embodiments, ECID is considered as pre-requisite procedure for some of the other positioning methods such as DL-TDOA or DL-AOD.

Operations in accordance with some embodiments are provided below:

According to embodiments, from the ECID result, the network node deduces the mapping between SSB and DL PRS resources, which can result in identification of the DL PRS resource via an SSB resource identification. The identified DL-PRS resource can then be provided to the UE to perform the DL-AOD measurements (e.g., RSRP measurements). Based upon the results, the network can then identify the strongest resource and its neighbor resources that the UE should measure, which can be used and/or reported. In certain aspects, there can be a learning-based mechanism in the network side to map from the ECID result how to prepare the AD for DL-AOD that can lead to measurements done on the best DL-PRS resource in terms of signal strength and all the neighbor resources (in both vertical/zenith or horizontal/azimuth) direction for the identified strongest resource. Even if the strongest resource is not available, the results obtained based upon the ECID result can be useful to narrow down the DL PRS resource for measurement, and also for the identification of strongest resource along with the radio condition measurement for the neighbor resource. In some embodiments, if the beam width of SSB and DL-PRS are the same (or similar) it would be easier to identify the strongest resource.

For the case when there is no ECID information available, or the network is unable to deduce the strongest resource, the network node may ask the UE to perform a beam sweep of various TRPs transmitting DL-PRS, and get the first result from the UE. In some embodiments, based upon the result obtained, the network node will identify the best resource with signal strength (strongest resource) and then prepare all the needed neighboring resources for reporting and or usage. From the second set of result, the network node can then compute the DL-AOD based upon interpolation.

Figure 8:
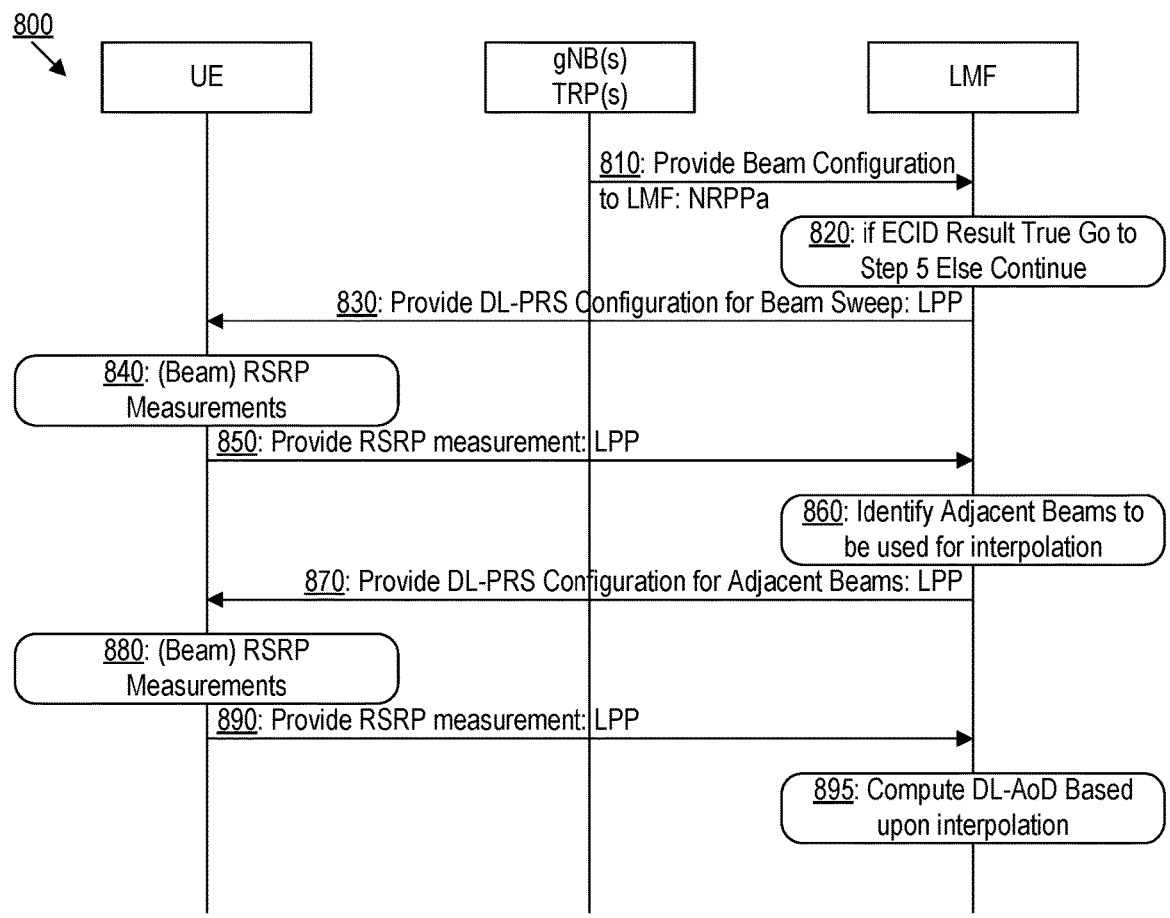
FIG. 8 is a flow chart illustrating an example of a process (e.g., a two step approach for UE assisted network-based DL-AOD interpolation) in accordance with some embodiments.

Referring now to FIG. 8, a two step process 800 is illustrated for a UE assisted network based DL-AOD interpolation according to some embodiments.

At block 810, each gNB provides it's beam configuration to the LMF so that the LMF can prepare the Assistance Data for DL PRS measurements.

At block 820, the LMF verifies whether it has UE's RRM measurements available, and whether it can deduce the strongest resource (center resource/beam) from the ECID RRM measurements.

At block 830, if no ECID results are available, or the network is unable to deduce the strongest resource, the LMF configures beam sweeping to be performed by the UE.

At block 840, the UE performs a beam sweep and identifies the strongest resource.

At block 850, the UE provides the result via LPP.

At block 860, the LMF evaluates the result and provides the additional DL PRS resource that the UE should evaluate. The additional DL PRS resource are the beams that are neighboring beams to the previously reported strongest resource from the beam sweep or ECID RRM procedure.

At block 870, the LMF configures additional measurement to be performed by UE.

At block 880, the UE performs the additional measurement.

At block 890, the UE provides the result to the LMF via LPP.

Figure 11:
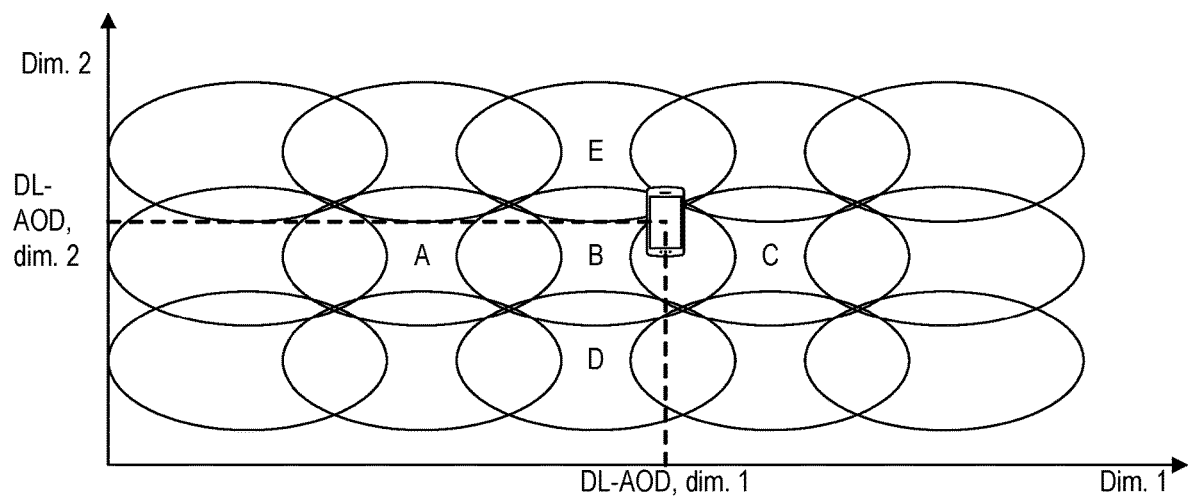

At block 895, the LMF computes DL-AOD based upon interpolation (e.g., as discussed with respect to FIGS. 10-11).

For the UE based case, a 2 step approach can also be used where the UE identifies the best DL PRS resource, and then requests that the network provides adjacent neighbor beams of the identified strongest beam. This request message can be a new message or new indication with the inclusion of strongest resource list of different resource sets and TRPs. Upon receiving such a request, the network may provide the neighboring beam information via dedicated signaling LPP or via RRC Broadcast.

The advantage of 2 step approach is that network may not need to inform the neighbor beam relations/topology in advance and only on demand. The downside is increased latency and complexity due to the need for two steps.

FIG. 9 illustrates an example of an ASN.1 where the UE makes such a request.

In certain aspects, The IE NR-DL-AOD-RequestAssistanceData is used by the target device to request assistance data from a location server.

Figure 12:
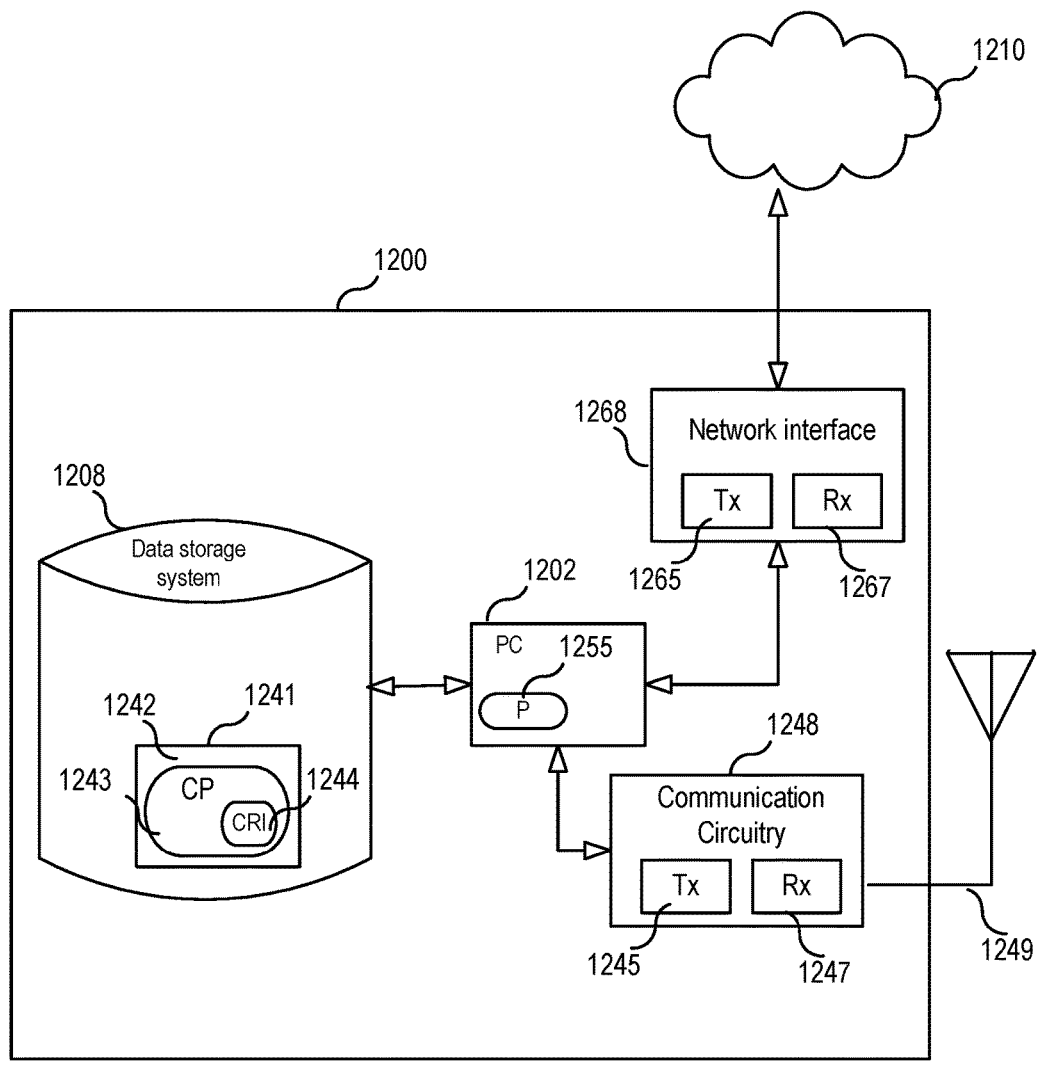
FIG. 12 is a block diagram illustrating an example of a network node in accordance with some embodiments.

FIG. 12 is a block diagram of an apparatus 1100 (e.g., a network node such as nodes 220, 230, 2203, 2205), according to some embodiments. As shown in FIG. 12, apparatus 1200 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 1200 may be a distributed computing apparatus); a network interface 1268 comprising a transmitter (Tx) 1265 and a receiver (Rx) 1267 for enabling apparatus 1200 to transmit data to and receive data from other nodes connected to a network 1210 (e.g., an Internet Protocol (IP) network) to which network interface 1268 is connected; communication circuitry 1248, which is coupled to an antenna arrangement 1249 comprising one or more antennas and which comprises a transmitter (Tx) 1245 and a receiver (Rx) 1247 for enabling apparatus 1200 to transmit data and receive data (e.g., wirelessly transmit/receive data); and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes apparatus 1200 (e.g., nodes 2203, 2205) to perform operations described herein (e.g., operations described herein with reference to the flow charts). In other embodiments, apparatus 1200 may be configured to perform operations described herein without the need for code. That is, for example, PC 1202 may consist merely of one or more ASICs. Hence, the features of the embodiments described herein may be implemented in hardware and/or software.

Figure 13:
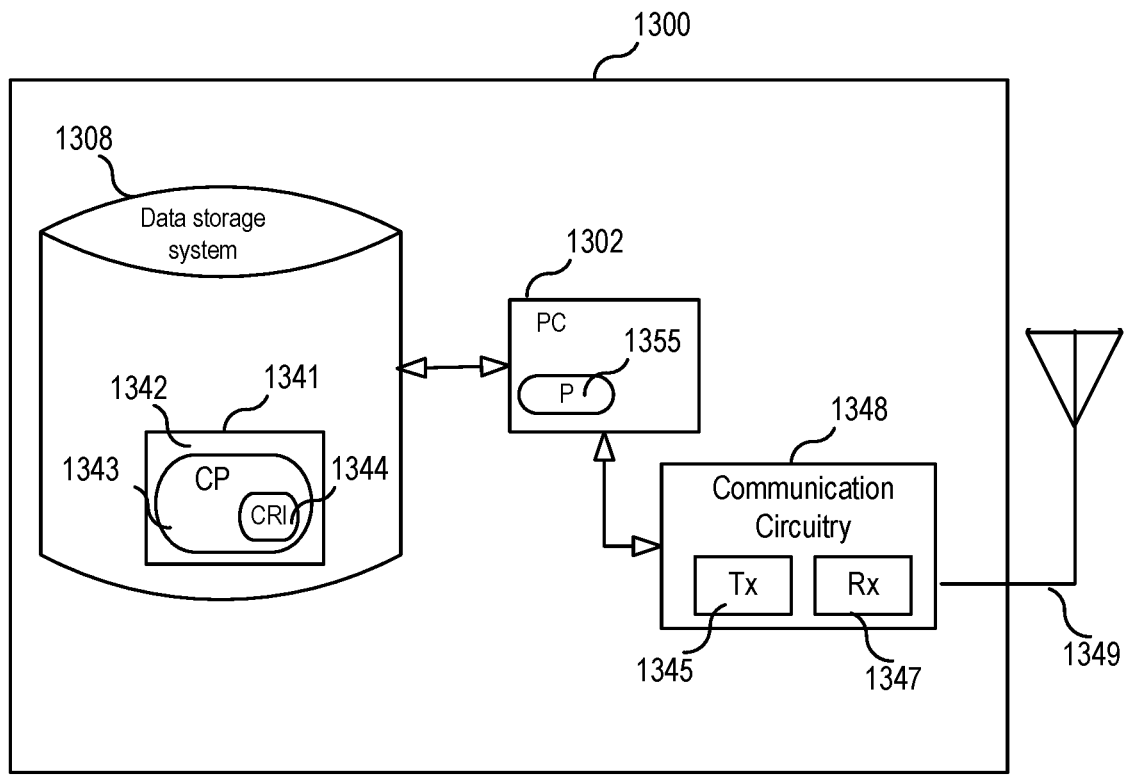
FIG. 13 is a block diagram illustrating an example of a device in accordance with some embodiments.

FIG. 13 is a block diagram of device (e.g., a UE such as UEs 110, 2201, 2202), according to some embodiments. As shown in FIG. 13, UE 2201, 2202 may comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like); communication circuitry 1348, which is coupled to an antenna arrangement 1349 comprising one or more antennas and which comprises a transmitter (Tx) 1345 and a receiver (Rx) 1347 for enabling UE 2201, 2202 to transmit data and receive data (e.g., wirelessly transmit/receive data); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes UE 2201, 2202 to perform operations described herein (e.g., operations described herein with reference to the flow charts). In other embodiments, UE 2201, 2202 may be configured to perform operations described herein without the need for code. That is, for example, PC 1302 may consist merely of one or more ASICs. Hence, the features of the embodiments described herein may be implemented in hardware and/or software.

In some embodiments, methods are provided for measuring and reporting radio resource conditions, identifying resources for measurement, interpolating metrics (e.g., DL AOD), and estimating position. At least these embodiments may be implemented on one or more of apparatuses 1200 and 1300.

Figure 14:
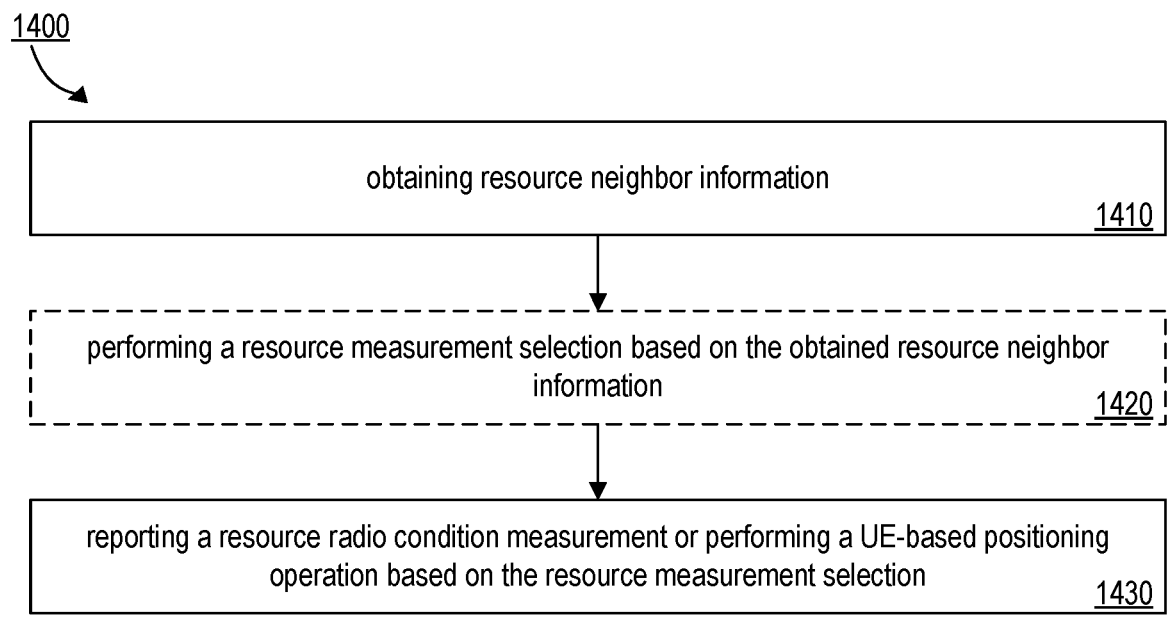
FIGS. 14-21 are flow charts illustrating examples of processes in accordance with some embodiments.

Referring now to FIG. 14, a process 1400 is provided according to embodiments. The process 1400 may be performed by a device, such as a UE, for example. The process may begin at block 1410, in which resource neighbor information is obtained. At block 1420, a resource measurement selection based, at least in part, on the obtained resource neighbor information is performed. According to embodiments, the resource measurement selection is one or more of: (1) selecting resources for resource radio condition measurements; and (2) selecting which resource radio condition measurements to perform. At block 1430, a resource radio condition measurement is reported or a UE-based positioning operation is performed, based at least in part, on the resource measurement selection. In some embodiments, process 1400 may further comprise any of the measurements, measurement selection techniques, neighbor identification and selection techniques, and dimensional analyses of Example 1 described above (e.g., in connection with FIG. 3 and related embodiments).

Figure 15:
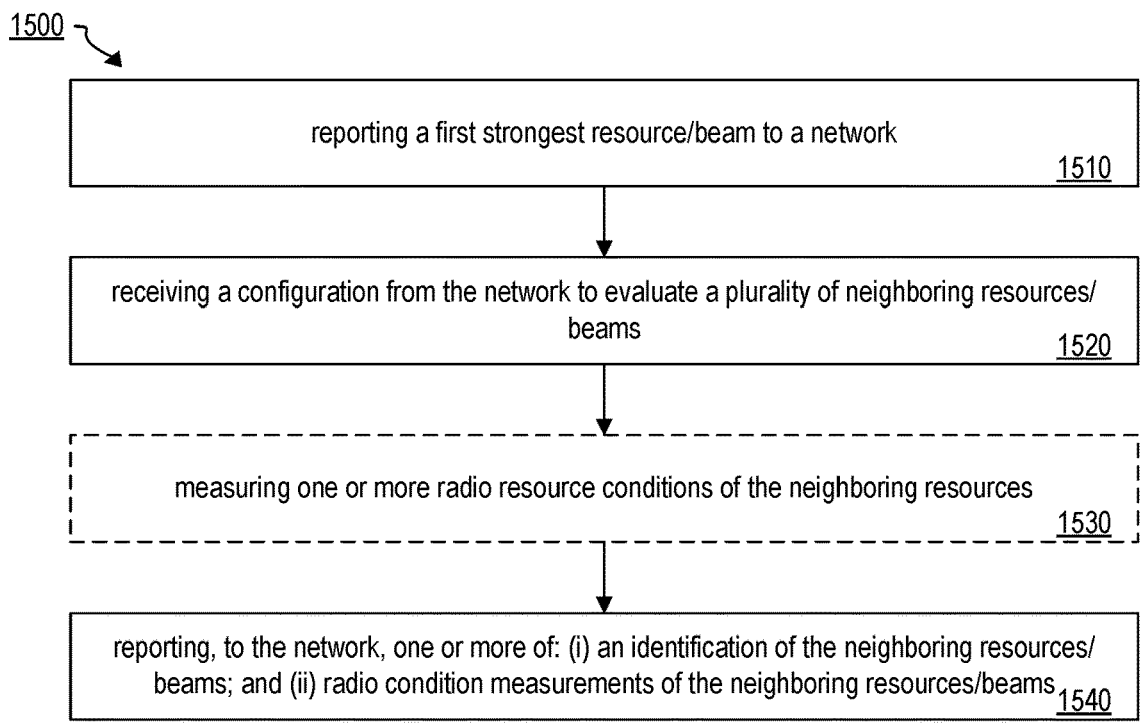

Referring now to FIG. 15, a process 1500 is provided according to embodiments. The process 1500 may be performed by a device, such as a UE, for example. The process may begin at block 1510, which comprises reporting a first strongest resource/beam to a network (e.g., a network node such as a gNB). At block 1520, a configuration is received from the network to evaluate a plurality of neighboring resources/beams of the reported first strongest beam. At block 1530, which may be optional in some embodiments, the process 1500 comprises measuring one or more radio resource conditions of the neighboring resources. At block 1540, the device reports to the network, one or more of: (i) an identification of the neighboring resources/beams; and (ii) radio condition measurements of the neighboring resources/beams. In some embodiments, process 1500 may further comprise any of the measurements, measurement selection techniques, neighbor identification and selection techniques, and dimensional analyses of Example 1 described above (e.g., in connection with FIG. 3 and related embodiments).

Figure 16:
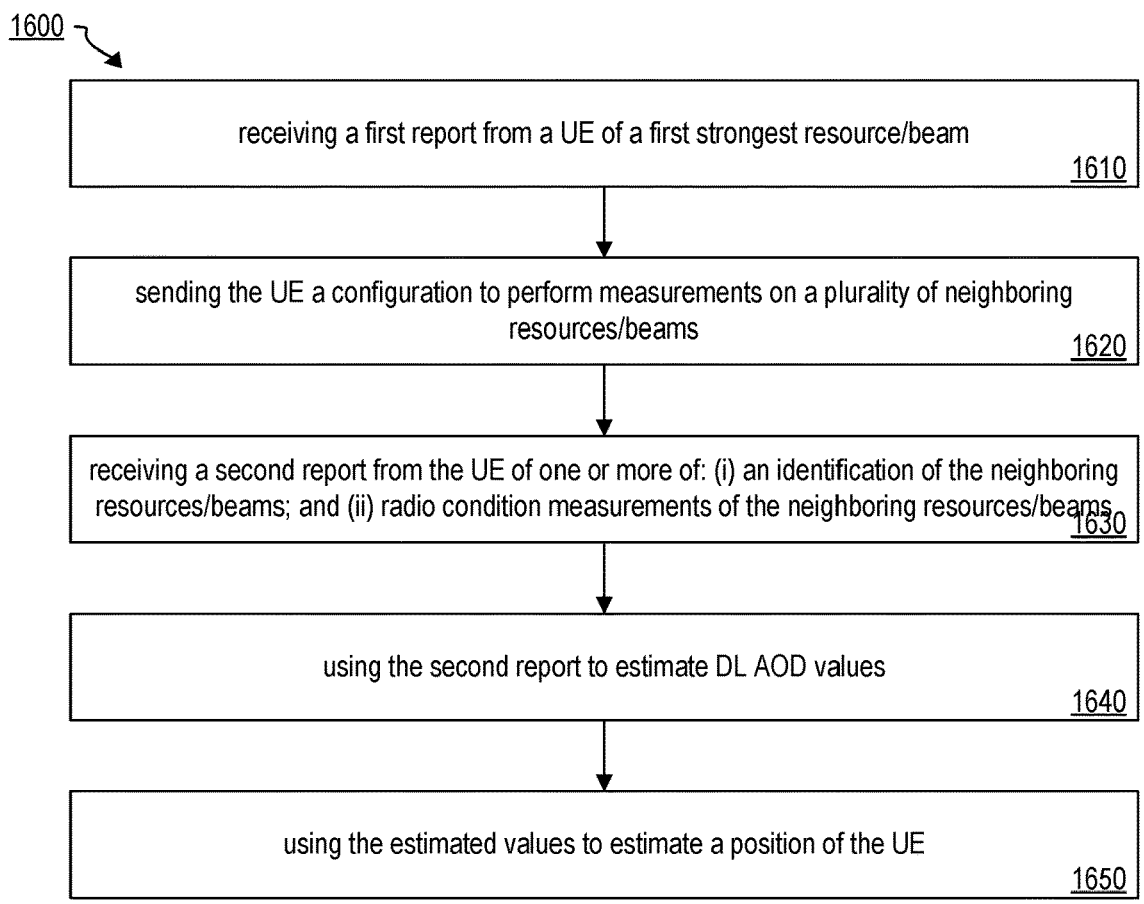

Referring now to FIG. 16, a process 1600 is provided according to embodiments. The process 1600 may be performed by the network (e.g., a network node), for example. The process may begin at block 1610, in which a first report is received from a UE of a first strongest resource/beam. At block 1620, a configuration is sent to the UE to perform measurements on a plurality of neighboring resources/beams of the received first strongest beam. At block 1630, a second report is received from the UE of one or more of: (i) an identification of the neighboring resources/beams; and (ii) radio condition measurements of the neighboring resources/beams. At block 1640, the second report is used to estimate DL AOD (e.g., based on interpolation) values. At block 1650, the estimated values are used to estimate a position of the UE.

Figure 17:
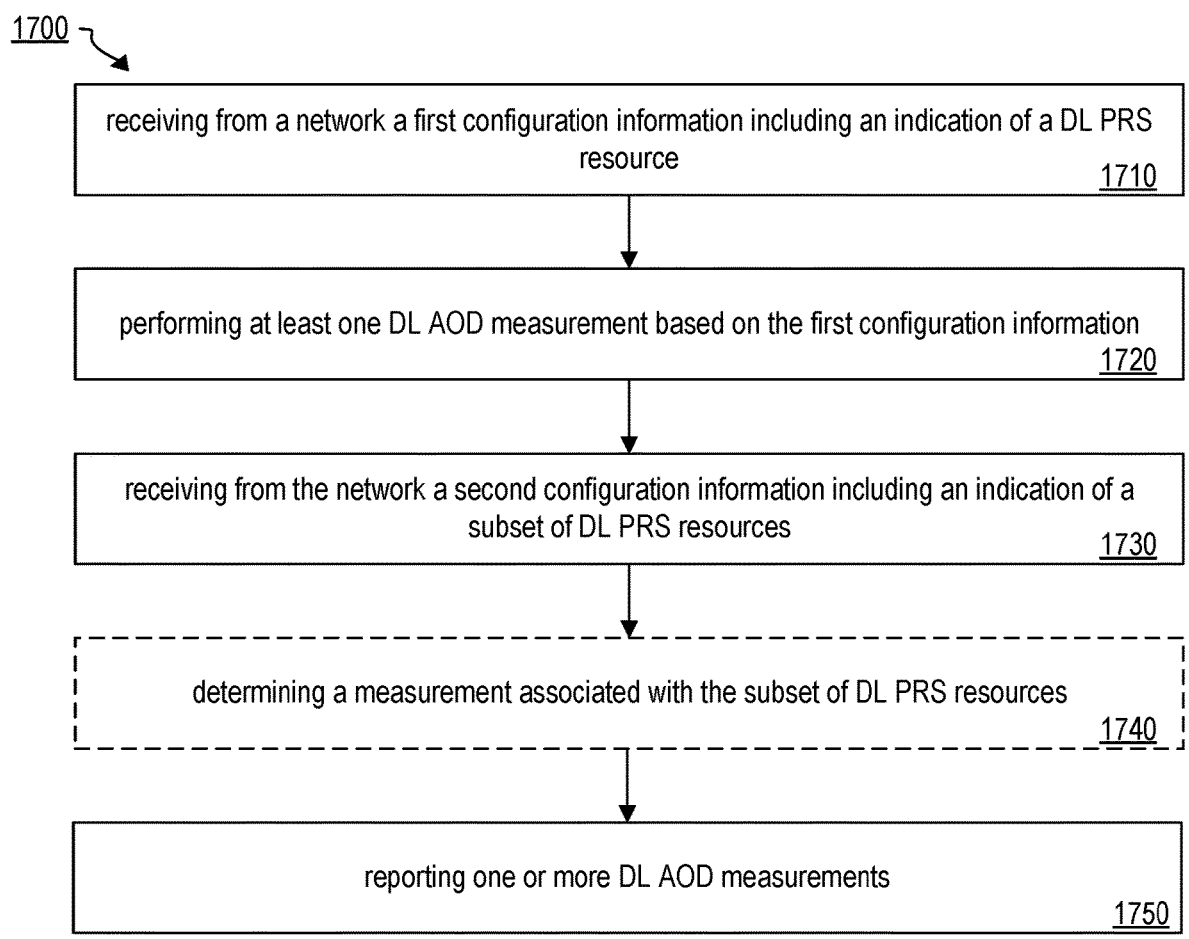

Referring now to FIG. 17, a process 1700 is provided according to embodiments. The process 1700 may be performed by a device, such as a UE, for example. The process may begin at block 1710, which comprises receiving from a network (e.g., from a node comprising the LMF) a first configuration including an indication of a DL PRS resource of a plurality of DL PRS resources (e.g., for performing DL AOD measurements). At block 1720, at least one DL AOD measurement is performed based on the first configuration information. In some examples, performing the DL AOD measurement includes measuring and reporting the strongest DL PRS resource for each TRP. At block 1730, second configuration information is received from the network including an indication of a subset of the plurality of DL PRS resources (e.g., to perform DL AOD measurements). At block 1740, the device may determine a measurement associated with the subset of the plurality of DL PRS resources. At block 1750, one or more DL AOD measurements are reported. In some examples, the one or more DL AOD measurements include at least one of: measurements associated with the DL PRS resource including at least a RSRP measurement or a path RSRP measurement indicating a strength of the DL PRS resource; and measurements associated with the subset of the plurality of DL PRS resources including at least a RSRP measurement or a path RSRP measurement indicating a strongest DL PRS resource of the plurality of DL PRS resources.

In some embodiments, reporting the one or more DL AOD measurements includes at least one of reporting a power of a DL PRS resource associated with the subset of the plurality of DL PRS resources; and a power of a certain path for a DL PRS resource of the subset of the plurality of DL PRS resources. In some examples, the power of the DL PRS resource is stronger than the power of each of the DL PRS resources in the subset of the plurality of DL PRS resources that are not reported and the power of the path for the DL PRS resource is stronger than the power of the same path of each of the DL PRS resources in the subset of the plurality of DL PRS resources that are not reported.

In some embodiments, the DL PRS resource is a first DL PRS resource, the subset of the plurality of DL PRS resources is a first subset of the plurality of DL PRS resources associated with the first DL PRS resource, the first configuration information comprises an indication of a second DL PRS resource of the plurality of DL PRS resources, and the second configuration information comprises an indication of a second subset of the plurality of DL PRS resources that is associated with the second DL PRS resource. In some examples, determining the measurement associated with the subset of the plurality of DL PRS resources can be in response to the first DL PRS resource being stronger than the second DL PRS resource. In additional or alternative examples, reporting the one or more DL AOD measurements includes reporting a measurement associated with first configuration information indicating that the first DL PRS resource is stronger than the second DL PRS resource. Reporting the one or more measurements can further include reporting the measurement associated with the first subset of the plurality of DL PRS resources. The measurement associated with the first subset of the plurality of DL PRS resources can include a measurement associated with a strongest DL PRS resource of the first subset of the plurality of DL PRS resources. In additional or alternative examples, the DL PRS resource and the subset of the plurality of DL PRS resources can be part of a DL PRS resource set. In other examples, the DL PRS resource and the subset of the plurality of DL PRS resources are each part of a different DL PRS resource set. In additional or alternative examples, reporting the measurements includes at least one of reporting a power associated with the subset of the plurality of DL PRS resources; and a power of a certain path associated with the subset of the plurality of DL PRS resources In additional or alternative embodiments, process 1700 may further include any of the measurements, measurement selection techniques, neighbor identification and selection techniques, and dimensional analyses of Example 1 described above (e.g., in connection with FIG. 3 and related embodiments).

Figure 18:
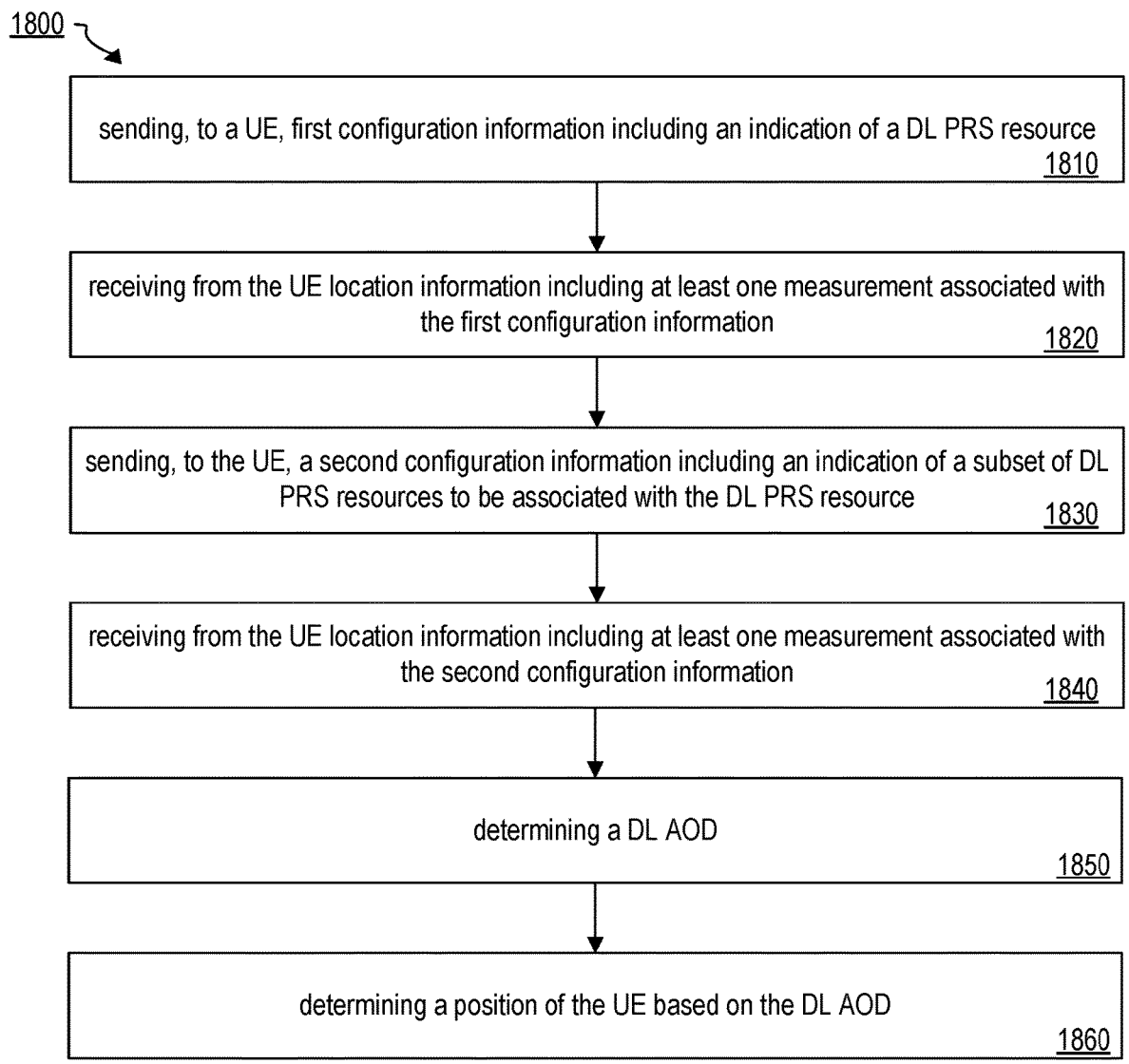

Referring now to FIG. 18, a process 1800 is provided according to embodiments. The process 1800 may be performed by the network (e.g., a network node), for example. The process may begin at block 1810, which includes sending, to a UE, first configuration information with an indication of a DL PRS resource of a plurality of DL PRS resources (e.g., for performing DL AOD measurements). At block 1820, the network can receive location information including a measurement report including at least one measurement associated with the first configuration information. In some examples, the at least one measurement includes the strongest DL PRS resource for each TRP. At block 1830, second configuration information including an indication of a subset of the plurality of DL PRS resources (e.g., to perform DL AOD measurements) is sent to the UE. In some examples, the second configuration information can include a restriction to measure the subset of the DL PRS resources. At block 1840, location information including a measurement report including at least one measurement associated with the second configuration information is received from the UE. At block 1850, the network determines a DL AOD. The DL AOD load may be determined using the at least one measurement associated with the first configuration information and the at least one measurement associated with the second configuration information. In some examples, the DL AOD is estimated based on interpolation between the beam directions of the reported DL PRS resources. At block 1860, the network determines a position of the UE based on the determined DL AOD.

Figures 19, 20:
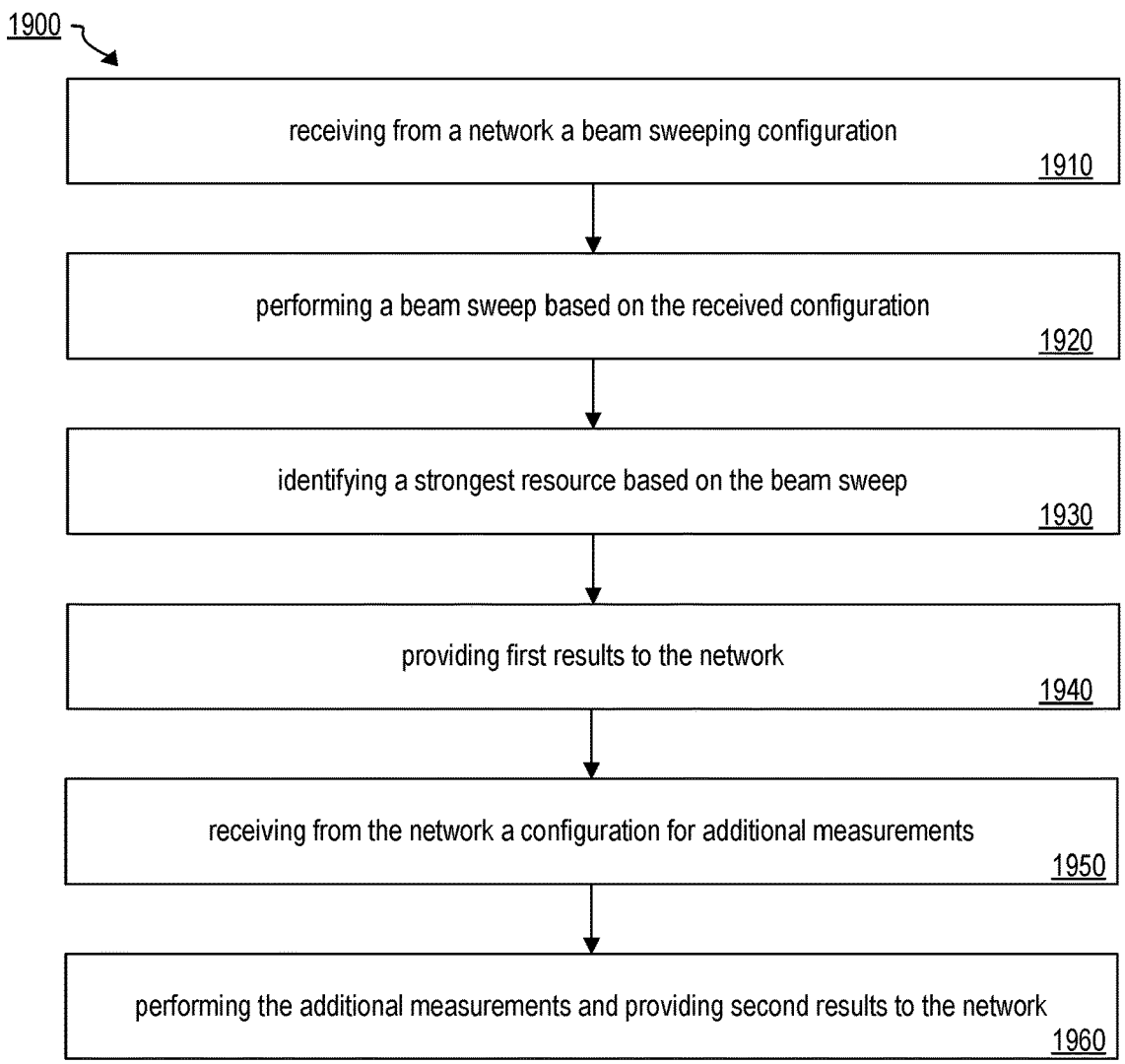

Referring now to FIG. 19, a process 1900 is provided according to embodiments. The process 1900 may be performed by a device, such as a UE, for example. The process may begin at block 1910, which comprises receiving from a network (e.g., a node comprising the LMF) a beam sweeping configuration (e.g., for DL-PRS). At block 1920, the device performs a beam sweep (e.g., RSRP measurements) based on the received configuration. At block 1930, the device identifies a strongest resource based on the beam sweep. At block 1940, the device provides first results to the network, wherein the result comprises at least an indication of the strongest resource (e.g., proving RSRP measurements for a plurality of beams). At block 1950, the device receives from the network a configuration for additional measurements, wherein the additional measurements relate to adjacent beams to the strongest resource. At block 1960, the device performs the additional measurements and provides second results to the network based on the additional measurements. In some embodiments, process 1900 may further comprise any of the measurements, measurement selection techniques, neighbor identification and selection techniques, and dimensional analyses of Example 1 described above (e.g., in connection with FIG. 3 and related embodiments).

Referring now to FIG. 20, a process 2000 is provided according to embodiments. The process 2000 may be performed by a device, such as a UE, for example. The process may begin at block 2010, in which a best DL PRS resource is identified. At block 2020, the device sends a message, wherein the message requests that the network provide information of adjacent neighbor beams of the identified strongest beam. At block 2030, the device receives neighboring beam information (e.g., via dedicated signaling LPP or via RRC broadcast). In some embodiments, process 2000 may further comprise any of the measurements, measurement selection techniques, neighbor identification and selection techniques, and dimensional analyses of Example 1 described above (e.g., in connection with FIG. 3 and related embodiments).

Figure 21:
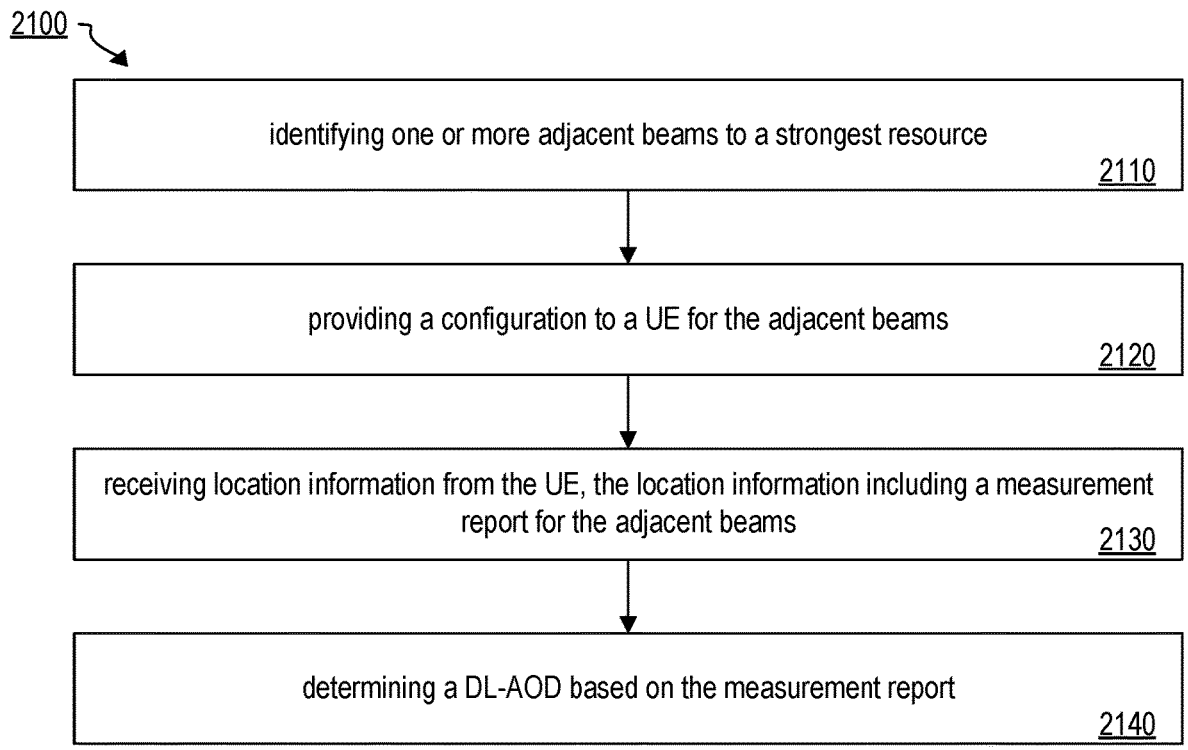

Referring now to FIG. 21, a process 2100 is provided according to embodiments. The process 2100 may be performed by the network (e.g., a network node), for example. The process may begin with at block 2110, which comprises identifying one or more adjacent beams to a strongest resource. At block 2120, a configuration (e.g, for DL-PRS) is provided to a UE for the adjacent beams. At block 2130, location information including a measurement report for the adjacent beams (e.g., one or more RSRP measurements) is received from the UE. At block 2140, the network determines a DL-AOD based, at least in part, on the received measurement report (e.g., using interpolation).

Referring now to FIGS. 10-11, one or more features can be interpolated. For example, DL AOD for one or more beams can be interpolated. Interpolation based on DL PRS RSRP as defined in NR Rel. 16 can be used, exemplifying the radio condition measurement. Interpolation can be done for higher DL AOD accuracy as shown in FIG. 10. In certain aspects, DL beams can have neighbors in 2 dimensions and interpolation can be done separately in each dimension as shown in FIG. 11.

In some embodiments, the DL AOD accuracy can be improved by interpolation between neighboring beams (e.g., neighboring DL PRS resources) from the same TRP. As an example, consider a horizontal unilateral antenna array. Let A, B and C be adjacent beams with the horizontal beam directions φA, φB resp. φC, as illustrated in FIG. 10. Assume that the UE measures the highest DL PRS resource radio condition for beam B and that the DL PRS resource radio condition of C is greater than that of A. Then it can be concluded that the horizontal DL AOD is somewhere between φB and φC. Moreover, with more precise knowledge of how the received power of the beams decrease with the distance |DL AOD−φi|, i∈{B, C}, interpolation can be done to estimate DL AOD more exactly within the interval [φB, φC].

In some embodiments, and more generally, a direction in a 3D space has two dimensions. Zenith and azimuth angles can be used to describe directions, but other parametrizations exist. Hence, a DL PRS Resource can have neighbors in two different dimensions. As an example, in FIG. 5, DL PRS resource B has neighbors {A, C} and {D, E} in dimension 1 resp. dimension 2. The DL-AOD of the UE in dimension 1 can be obtained from interpolation between B (the strongest DL PRS resource) and C (its strongest neighbor in dimension 1), while the DL-AOD of the UE in dimension 2 can be obtained from interpolation of the beams B and E.

Figure 22:
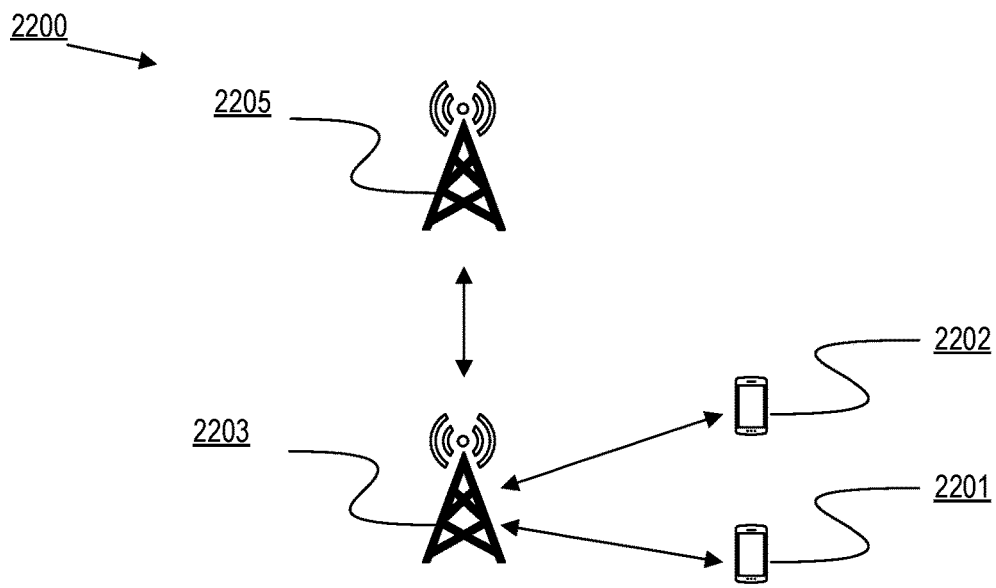
FIG. 22 is a schematic diagram illustrating an example of a system in accordance with some embodiments.

Referring now to FIG. 22, a communication system 2200 is shown according to some embodiments. The system may, for instance, implement 5G new radio (NR) and include a first node 2203, a second node 2205, a first UE 2201, and a second UE 2202. The nodes may be, for instance, base stations, such as NBs, eNBs, gNBs or other types of wireless access points or network nodes. The UEs may be any form of UE according to embodiments, such as mobile telephones, personal digital assistants, electronic readers, portable electronic tablets, wireless sensors, machine communication devices, personal computers, and laptop computers.

Improved accuracy DL AOD and UE position estimates can be achieved in a system implementation, such as in communication system 2200. According to embodiments, the network (e.g., via nodes 2203, 2205) signals resource neighbor information to a UE (e.g., UE 2201, 2202), giving the UE knowledge of what DL PRS resources are neighbors. The UE can then utilize the resource neighbor information to measure and report the radio condition for 1. the DL PRS resource with strongest radio condition, here referred to as the strongest resource;
2. the strongest DL PRS resources among the DL PRS resources which are neighbors to the strongest resource.

In certain aspects, the network uses the reported radio condition and the corresponding DL PRS IDs to interpolate between the known DL PRS resource beam directions to achieve a high accuracy DL AOD estimate. The network uses the DL AOD estimates (possibly in combination with other measurements) to position the UE with high accuracy.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of operations, this was done solely for the sake of illustration. Accordingly, it is contemplated that some operations may be added, some operations may be omitted, the order of the operations may be re-arranged, and some operations may be performed in parallel.

Generally, all terms used herein are to be interpreted according to their ordinary meaning in the relevant technical field, unless a different meaning is clearly given and/or is implied from the context in which it is used. All references to a/an/the element, apparatus, component, means, step, or operation are to be interpreted openly as referring to at least one instance of the element, apparatus, component, means, step, or operation unless explicitly stated otherwise. The operations of any methods disclosed herein do not have to be performed in the exact order disclosed, unless an operation is explicitly described as following or preceding another operation and/or where it is implicit that a operation must follow or precede another operation.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

While first and second examples are provided (including various sub-examples), according to embodiments, descriptions with respect to a first example or sub-example may be applied with respect to second, and vice-versa. Similarly, descriptions regarding interpolation may be used in connection with any of the examples described herein.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc. It should be emphasized that the term "comprises/comprising" when used in this specification is taken to specify the presence of stated features, integers, operations, or components, but does not preclude the presence or addition of one or more other features, integers, operations, components or groups thereof. It should also be noted that the words "a" or "an" preceding an element do not exclude the presence of a plurality of such elements. The term "configured to" used herein may also be referred to as "arranged to", "adapted to", "capable of" or "operative to".

It should also be emphasized that the operations of the methods may, without departing from the embodiments herein, be performed in another order than the order in which they appear herein.

Enumerated Examples are described below.

A1. A method performed in a device (e.g., a UE) comprising the steps of: obtaining resource neighbor information; performing a resource measurement selection based at least in part on the obtained resource neighbor information; and reporting a resource radio condition measurement or performing a UE-based positioning operation based at least in part on the resource measurement selection.

A2. The method of A1, further comprising: providing an indication of the device's capabilities for supporting resource neighbor information for resource radio condition measurements.

A3. The method of A2, wherein the indication is provided to a network node and is in response to a request from the network node.

A4. The method of any of A1-A3, further comprising: providing a request for assistance data.

A5. The method of A4, wherein the request for assistance is provided to a network node and is in response to a request form the network node.

A6. The method of any of A1-A5, wherein the resource measurement selection is one or more of: (1) selecting resources for resource radio condition measurements; and (2) selecting which resource radio condition measurements to perform.

A7. The method of A6, wherein the radio condition is one or more of: a DL-PRS RSRP measurement (e.g., aggregating all received power contributions associated to a DL-PRS resource); a measurement (e.g., a PRS RSRP) of the first detected path of a received DL-PRS signal; a measurement (e.g., a PRS RSRP) of a specific detected path of a received DL-PRS signal; a measurement (e.g., a PRS RSRP) of the strongest detected path of a received DL-PRS signal; a PRS signal quality measurement (e.g., aggregating all power contributions associated to a resource, or of the first detected path of a received DL-PRS signal, or of a specific detected path of a received DL-PRS signal or of the strongest detected path of a received DL-PRS signal); and a cross-correlation metric based on a received DL PRS signal that is cross-correlated with a DL-PRS signal replica.

A8. The method of any of A1-A7, wherein the resource neighbor information is obtained from a network node.

A9. The method of any of A1-A8, further comprising: measuring one or more radio resource conditions (e.g., in accordance with the resource measurement selection).

A10. The method of any of A1-A9, wherein the obtained resource neighbor information comprises one or more adjacency matrices.

A11. The method of any of A6-A10, wherein selected resources for resource radio condition measurements are one or more of general neighbors, neighbors in dimension 1, and/or neighbors in dimension 2.

A12. The method of A11, wherein selected neighbors are determined by the UE (e.g., through determination of resource indices or from a received list).

A13. The method of any of A6-A12, further comprising: receiving resource selection control information (e.g., containing a parameter such as a flag bit, priority value, or informational element) that controls resources selected by the UE for measurement and/or reporting.

A14. The method of any of A1-A13, wherein reporting a resource radio condition measurement or performing a UE-based positioning operation comprises: determining the resource corresponding to the strongest measured resource radio condition (e.g., the strongest resource); and selecting one or more neighbor resources among the neighboring resources of the strongest resource.

A15. The method of A14, wherein the selected neighbor resource corresponds to the strongest measured resource radio condition among the neighbor resource to the strongest resource; the selected resource (e.g., DL PRS resource) has strongest radio condition measurement among the DL PRS resources which are neighbors to the strongest resource in dimension 2, but is not the strongest dimension 1 resource neighbor; the selected resources are the N DL PRS resources with strongest radio condition measurements among the DL PRS resources which are general neighbors to the strongest resource, where N is a positive integer; or the selected resources are the DL PRS resource with strongest radio condition measurement among the general neighbors of the strongest resource (i.e., the "first neighbor resource"), and the DL PRS resource with strongest radio condition measurement among the DL PRS resources that are general neighbors of both the strongest resource and the first neighbor resource.

A16. The method of any of A1-A15, wherein the UE measures and reports for more than three DL PRS resources.

A17. The method of any of A1-A16, wherein the UE determines whether to evaluate neighbors (e.g., determine and/or measure) in one dimension (1D), two dimensions (2D), or both 1D and 2D.

A18. The method of any of A1-A17, wherein a selection of one or more neighboring resources is based on a pre-determined association rule (e.g., signaled via LPP).

A19. The method of any of A1-A18, wherein reporting comprises sending a resource ID for at least one neighboring resource.

A20. The method of A15, wherein the UE is configured to select which one of the methods described in A15 (or of a subset of these methods) to use based on a configuration parameter signaled from the network.

A21. The method of A15, wherein N=1 (e.g., for 1D), N>=3 (e.g., for 2D), and/or N=2 (e.g., where beams appear the same in both 1D and 2D).

B1. A method in a device (e.g., a UE), comprising the steps of: reporting a first strongest resource/beam to a network (e.g., a network node such as a gNB); receiving a configuration from the network to perform measurements on a plurality of neighboring resources/beams of the reported first strongest beam; and reporting, to the network, one or more of: (i) an identification of the neighboring resources/beams; and (ii) radio condition measurements of the neighboring resources/beams.

B2. The method of B1, further comprising: measuring one or more radio resource conditions of the neighboring resources.

B3. The method of B1 or B2, wherein the received configuration further configures the UE to perform a second measurement and second reporting of a strongest resource.

B4. The method of B3, further comprising: reporting a second strongest resource/beam.

B5. The method of B4, wherein the second strongest resource/beam is reported together with an identification of, or measurement values for, neighboring resources/beam.

B6. The method of any of B3-B5, wherein the second strongest resource is measured based on different reference signals or metrics than the first strongest resource.

B7. The method of any of B1-B6, wherein the UE measures and reports all neighboring beams to the network.

B8. The method of any of B1-B6, wherein the UE measures and reports a subset of neighboring beams to the network, and where in the subset is defined by one of: the N strongest neighbors, where N is preconfigured or configured by the network; or the strongest neighbor in each of two groups of neighbors, where the groups are configured by the network and may correspond to neighbors in two dimensions.

B9. The method of any of B1-B8, wherein the UE reports the first strongest resource/beam and measures and/or reports the plurality of neighboring resources/beams based on the same DL PRS resource set.

B10. The method of any of B1-B8, wherein the UE reports the first strongest resource/beam based on CSI RS or SS, and wherein the UE measures and/or reports the plurality of neighbor resources/beams (or the second strongest resource/beam) based on DL PRS with QCL-D relation with the CSI-RS or SSB.

B11. The method of any of B1-B10, wherein the UE determines whether to evaluate neighbors (e.g., determine and/or measure) in one dimension (1D), two dimensions (2D), or both 1D and 2D.

B12. The method of any of B1-B11, wherein a selection of one or more neighboring resources is based on a pre-determined association rule (e.g., signaled via LPP).

B13. The method of any of B1-B12, wherein reporting comprises sending a resource ID for at least one neighboring resource.

C1. A method in a network node, comprising the steps of: receiving a first report from a UE of a first strongest resource/beam; sending the UE a configuration to perform measurements on a plurality of neighboring resources/beams of the received first strongest beam; receiving a second report from the UE of one or more of: (i) an identification of the neighboring resources/beams, and (ii) radio condition measurements of the neighboring resources/beams; using the second report to estimate DL AOD (e.g., based on interpolation) values; and using the estimated values to estimate a position of the UE.

D1. A method in a device (e.g., a UE), comprising the steps of: receiving from a network (e.g., from a node comprising the LMF) a first configuration with one or more DL PRSs for performing DL AOD measurements; performing at least one DL AOD measurement based on the configuration, comprising measuring and reporting the strongest DL PRS resource for each TRP; receiving from the network a second configuration to perform DL AOD measurements, having a restriction to measure a subset of the DL PRS resources; measuring the subset of configured DL PRS resources; and reporting the measurements.

E1. A method in a node (e.g., comprising an LMF), comprising the steps of: sending, to a UE, a first configuration with one or more DL PRSs for performing DL AOD measurements; receiving from the UE a report of the strongest DL PRS resource for each TRP; sending, to the UE, a second configuration to perform DL AOD measurements, having a restriction to measure a subset of the DL PRS resources; receiving from the UE a measurement report for the subset of configured DL PRS resources; using the measurement report to estimate DL AOD based on interpolation between the beam directions of the reported DL PRS resources; and using the estimated DL AOD to estimate a position of the UE.

F1. A method in a device (e.g., a UE), comprising the steps of: receiving from a network (e.g., a node comprising the LMF) a beam sweeping configuration (e.g., for DL-PRS); performing a beam sweep (e.g., RSRP measurements) based on the received configuration; identifying a strongest resource based on the beam sweep; providing first results to the network, wherein the result comprise at least an indication of the strongest resource (e.g., proving RSRP measurements for a plurality of beams); receiving from the network a configuration for additional measurements, wherein the additional measurements relate to adjacent beams to the strongest resource; performing the additional measurements; and providing second results to the network based on the additional measurements.

F2. The method of F1, wherein the first and second results are provided via LPP.

G1. A method in a device (e.g., a UE), comprising the steps of: identifying a best DL PRS resource; sending a message, wherein the message requests that the network provide adjacent neighbor beams of the identified strongest beam; and receiving neighboring beam information (e.g., via dedicated signaling LPP or via RRC broadcast).

G2. The method of G1, wherein the message is a portion of a message indicating a strongest resource list of different resource sets and TRPs. G3. The method of G1 or G2, wherein the message is sent on-demand.

H1. A method in a network node (e.g., a node comprising an LMF), comprising the steps of: identifying one or more adjacent beams to a strongest resource; providing a configuration (e.g, for DL-PRS) to a UE for the adjacent beams; receiving a report from the UE for the adjacent beams (e.g., one or more RSRP measurements); and determining a DL-AOD based at least in part on the received report (e.g., using interpolation).

H2. The method of H1, further comprising (e.g., before identifying one or more adjacent beams): providing (e.g., via LPP) to a UE a DL-PRS configuration for beam sweeping; and receiving (e.g., via LPP) a measurement report from the UE (e.g., comprising one or more RSRP measurements) based on the configured beam sweep, wherein the report indicates a strongest resource, wherein the identified one or more adjacent beams are adjacent the strongest resource.

H3. The method of H2, further comprising: receiving (e.g., in an LMF from a gNB) one or more beam configurations (e.g., via NRPPa).

H4. The method of H1, further comprising (e.g., before identifying one or more adjacent beams): receiving an enhanced cell identity (ECID) report; based at least in part on the ECID report, prepare a mapping (e.g., between SSB and DL-PRS resources); providing an identification of one or more DL-PRS resources to the UE for DL-AOD measurements (e.g., RSRP measurements); receiving a measurement report from the UE; determining a strongest DL PRS resource, wherein the adjacent beams are identified based on the strongest resource.

I1. A network node (e.g., gNB) adapted to perform any of C, E, H.

J1. A UE adapted to perform any of A, B, D, F, G.

K1. A computer program comprising instructions that when executed by processing circuitry of an apparatus causes the apparatus to perform the method of any one of A-H.

K2. A carrier containing the computer program of K1, wherein the carrier is one of an electronic signal, an optical signal, a radio signal, and a computer readable storage medium.

L1. A communication device in a communications network, the communication device adapted to perform any of the operations of Embodiments A, B, D, F, and G.

M1. A network node in a communications network, the network node adapted to perform any of the operations of Embodiments C, E, and H.

N1. A non-transitory computer readable medium having instructions stored therein that are executable by processing circuitry of a communication device to cause the communication device to perform any of the operations of Embodiments A, B, D, F, and G.

O1. A non-transitory computer readable medium having instructions stored therein that are executable by processing circuitry of a network node to cause the network node to perform any of the operations of Embodiments C, E, and H.

The invention claimed is:

1. A method performed by a communication device in a communications network, the method comprising:
   receiving first configuration information from a network node in the communications network, the first configuration including an indication of a downlink, DL, positioning reference signal, PRS, resource of a plurality of DL PRS resources;
   performing at least one DL angle of departure, AOD, measurement based on the first configuration information;
   receiving second configuration information associated with the first configuration from the network node for prioritizing additional resource selection, the second configuration information including an indication of a subset of the plurality of DL PRS resources; and
   reporting measurements associated with the DL PRS resource including at least a reference signal received power, RSRP, measurement or a path RSRP measurement indicating a strength of the DL PRS resource, and measurements associated with the subset of the plurality of DL PRS resources including at least a RSRP measurement or a path RSRP measurement indicating a strongest DL PRS resource of the plurality of DL PRS resources.

2. The method of claim 1, wherein the second configuration information comprises a priority indication information element.

3. The method of claim 1, wherein the subset of the plurality of DL PRS resources is associated to the first configuration by being neighbor DL PRS resources.

4. The method of claim 1, wherein the subset of the plurality of DL PRS resources comprise resource neighbor information for the DL PRS resource; and further comprising:
   performing a resource measurement selection based at least in part on the resource neighbor information.

5. The method of claim 1, wherein the DL PRS resource and the subset of the plurality of DL PRS resources are each part of a different DL PRS resource set.

6. The method of claim 1, further comprising:
   providing an indication of capabilities of the communication device.

7. The method of claim 6, wherein the indication of capabilities is for supporting resource neighbor information for resource radio condition measurements.

8. The method of claim 1, wherein the DL PRS resource is a first DL PRS resource,
   wherein the subset of the plurality of DL PRS resources is a first subset of the plurality of DL PRS resources associated with the first DL PRS resource,
   wherein the first configuration information comprises an indication of a second DL PRS resource of the plurality of DL PRS resources, and
   wherein the second configuration information comprises an indication of a second subset of the plurality of DL PRS resources that is associated with the second DL PRS resource.

9. The method of claim 8, further comprising:
   determining a measurement associated with the first subset of the plurality of DL PRS resources in response to the first DL PRS resource being stronger than the second DL PRS resource,
   wherein the reporting measurements comprises:
   reporting a measurement associated with the first configuration information indicating that the first DL PRS resource is stronger than the second DL PRS resource; and
   reporting the measurement associated with the first subset of the plurality of DL PRS resources.

10. The method of claim 9, wherein the measurement associated with the first subset of the plurality of DL PRS resources comprises a measurement associated with a strongest DL PRS resource of the first subset of the plurality of DL PRS resources.

11. A method performed by a network node in a communications network, the method comprising:
    transmitting first configuration information to a communication device in the communications network, the first configuration information including an indication of a downlink, DL, positioning reference signal, PRS, resource of a plurality of DL PRS resources;
    transmitting second configuration information to the communication device for prioritizing additional resource selection, the second configuration information including an indication of a subset of the plurality of DL PRS resources to be associated with the DL PRS resource; and
    receiving location information comprising a measurement report from the communication device comprising at least one measurement associated with the first configuration information and at least one measurement associated with the second configuration information.

12. The method of claim 11, wherein the second configuration information comprises a priority indication information element.

13. The method of claim 11, wherein the subset of the plurality of DL PRS resources is associated to the first configuration by being neighbor DL PRS resources.

14. The method of any of claim 11, wherein the subset of the plurality of DL PRS resources comprise resource neighbor information for the DL PRS resource.

15. The method of claim 11, wherein the DL PRS resource and the subset of the plurality of DL PRS resources are each part of a different DL PRS resource set.

16. The method of claim 11, further comprising:
receiving an indication of capabilities of the communication device.

17. The method of claim 16, wherein the indication of capabilities is for supporting resource neighbor information for resource radio condition measurements.

18. A communication device in a communications network, the communication device comprising:
processing circuitry; and
memory coupled to the processing circuitry and having instructions stored therein that are executable by the processing circuitry to cause the communication device to:
receive a first configuration information from a network node in the communications network, the first configuration including an indication of a downlink, DL, positioning reference signal, PRS, resource of a plurality of DL PRS resources;
perform at least one DL angle of departure, AOD, measurement based on the first configuration information;
receive second configuration information associated with the first configuration for prioritizing additional resource selection, the second configuration information including an indication of a subset of the plurality of DL PRS resources; and
report measurements associated with the DL PRS resource including at least a reference signal received power, RSRP, measurement or a path RSRP measurement indicating a strength of the DL PRS resource, and measurements associated with the subset of the plurality of DL PRS resources including at least a RSRP measurement or a path RSRP measurement indicating a strongest DL PRS resource of the plurality of DL PRS resource.

19. A network node in a communications network, the network node comprising:
processing circuitry; and
memory coupled to the processing circuitry and having instructions stored therein that are executable by the processing circuitry to cause the network node to:
transmit first configuration information to a communication device in the communications network, the first configuration information including an indication of a downlink, DL, positioning reference signal, PRS, resource of a plurality of DL PRS resources;
transmit second configuration information to the communication device for prioritizing additional resource selection, the second configuration information including an indication of a subset of the plurality of DL PRS resources to be associated with the DL PRS resource; and
receiving location information comprising a measurement report from the communication device comprising at least one measurement associated with the first configuration information and at least one measurement associated with the second configuration information.

20. A computer program or a computer program product comprising a non-transitory storage medium including a computer program, the computer program comprising program code to be executed by processing circuitry of a communication device in a communications network, whereby execution of the program code causes the communication device to perform the steps of claim 1.

* * * * *